United States Patent
Olmos et al.

(10) Patent No.: US 9,898,625 B2
(45) Date of Patent: Feb. 20, 2018

(54) METHOD AND APPARATUS FOR LIMITING ACCESS TO AN INTEGRATED CIRCUIT (IC)

(71) Applicant: FREESCALE SEMICONDUCTOR, INC., Austin, TX (US)

(72) Inventors: Alfredo Olmos, Austin, TX (US); James R. Feddeler, Austin, TX (US); Miten H. Nagda, Austin, TX (US); Stefano Pietri, Austin, TX (US)

(73) Assignee: NXP USA, INC., Austin, TX (US)

( * ) Notice: Subject to any disclaimer, the term of this patent is extended or adjusted under 35 U.S.C. 154(b) by 364 days.

(21) Appl. No.: 14/727,299

(22) Filed: Jun. 1, 2015

(65) Prior Publication Data

US 2015/0317496 A1    Nov. 5, 2015

Related U.S. Application Data

(63) Continuation of application No. 13/566,363, filed on Aug. 3, 2012, now Pat. No. 9,046,570.

(51) Int. Cl.
*G01R 11/24* (2006.01)
*G06F 21/81* (2013.01)
(Continued)

(52) U.S. Cl.
CPC ....... *G06F 21/81* (2013.01); *G01R 31/31719* (2013.01); *G06F 1/14* (2013.01); *G06F 1/28* (2013.01)

(58) Field of Classification Search
CPC ... G06F 21/81; G06F 1/14; G06F 1/28; G01R 31/317; G01R 11/24; G01R 11/25;
(Continued)

(56) References Cited

U.S. PATENT DOCUMENTS

| 4,013,902 A | 3/1977 | Payne |
| 4,040,022 A | 8/1977 | Takii |

(Continued)

FOREIGN PATENT DOCUMENTS

| WO | WO 00/45244 A1 | 8/2000 |
| WO | WO 2004/111667 A1 | 12/2004 |

OTHER PUBLICATIONS

Notice of Allowance dated Jan. 2, 2015 for U.S. Appl. No. 13/566,363, 15 pages.

(Continued)

*Primary Examiner* — Son Le

(57) ABSTRACT

A method and apparatus for limiting access to an integrated circuit (IC) upon detection of abnormal conditions is provided. At least one of abnormal voltage detection, abnormal temperature detection, and abnormal clock detection are provided with low power consumption. Both abnormally low and abnormally high parameter values (e.g. abnormally low or high voltage, temperature, or clock frequency) may be detected. Abnormal clock detection may also detect a stopped clock signal, including a clock signal stopped at a low logic level or at a high logic level. Furthermore, abnormal clock detection may detect an abnormal duty cycle of a clock signal. A sampled bandgap reference may be used to provide accurate voltage and current references while consuming a minimal amount of power. Upon detection of an abnormal parameter value, one or more tamper indications may be provided to initiate tampering countermeasures, such as limiting access to the IC.

20 Claims, 9 Drawing Sheets

(51) Int. Cl.
  *G06F 1/28*  (2006.01)
  *G06F 1/14*  (2006.01)
  *G01R 31/317* (2006.01)
(58) Field of Classification Search
  CPC .. G01R 31/31719; G01R 22/00; G01R 23/00;
  G01R 23/02; G01R 23/05
  See application file for complete search history.

(56) References Cited

U.S. PATENT DOCUMENTS

| | | | |
|---|---|---|---|
| 4,301,380 | A | 11/1981 | Thomas |
| 4,495,858 | A | 1/1985 | Smith |
| 4,766,567 | A | 8/1988 | Kato |
| 5,187,389 | A | 2/1993 | Hall et al. |
| 5,196,833 | A | 3/1993 | Kemp |
| 5,199,032 | A | 3/1993 | Sparks et al. |
| 5,440,263 | A | 8/1995 | Fournel et al. |
| 5,495,453 | A | 2/1996 | Wociechowski et al. |
| 5,594,360 | A | 1/1997 | Wociechowski |
| 5,619,156 | A | 4/1997 | Jandu |
| 5,619,165 | A | 4/1997 | Fournel et al. |
| 5,814,995 | A | 9/1998 | Tasdighi |
| 5,903,767 | A | 5/1999 | Little |
| 5,920,182 | A | 7/1999 | Migliavacca |
| 6,272,439 | B1 | 8/2001 | Buer et al. |
| 6,531,911 | B1 | 3/2003 | Hsu et al. |
| 6,559,629 | B1 | 5/2003 | Fernald |
| RE38,154 | E | 6/2003 | Moroni et al. |
| 6,661,218 | B2 | 12/2003 | Kim |
| 6,876,250 | B2 | 4/2005 | Hsu et al. |
| 7,274,226 | B2 | 9/2007 | Yoshizawa |
| 7,579,898 | B2 | 8/2009 | Soldera et al. |
| 7,734,440 | B2 | 6/2010 | Hattis |
| 7,839,139 | B2 | 11/2010 | Maltione et al. |
| 7,863,944 | B2 | 1/2011 | Wang |
| 8,378,710 | B1* | 2/2013 | Al-Kadi ............ G06K 19/07372 326/15 |
| 2002/0194017 | A1 | 11/2002 | Post et al. |
| 2003/0149914 | A1 | 8/2003 | Kim |
| 2007/0069875 | A1* | 3/2007 | Doi ..................... G06F 21/75 340/440 |
| 2008/0074255 | A1 | 3/2008 | Park et al. |
| 2008/0285623 | A1* | 11/2008 | Petruzzi ................. H01L 23/34 374/163 |
| 2010/0332851 | A1 | 12/2010 | Priel et al. |
| 2011/0057735 | A1 | 3/2011 | Honda |
| 2011/0163736 | A1 | 7/2011 | Trimmer |
| 2011/0285444 | A1* | 11/2011 | Uemura ............ G01C 19/5614 327/299 |
| 2014/0035560 | A1 | 2/2014 | Olmos et al. |

OTHER PUBLICATIONS

Final Office Action dated Dec. 17, 2012 for U.S. Appl. No. 12/919,541 26 pages.
Non-Final Office Action dated Jun. 13, 2012 for U.S. Appl. No. 12/919,541 18 pages.
Notice of Allowance dated Jun. 4, 2014 for U.S. Appl. No. 12/919,541 15 pages.
Notice of Allowance dated Oct. 25, 2013 for U.S. Appl. No. 12/919,541 14 pages.
Aita, A. et al., "Low-Power Operation of a Precision CMOS Temperature Sensor based on Substrate PNPs," IEEE Sensors 2007 Conference, Oct. 28-31, 2007; pp. 856-859.
Dantas, J.M.C. et al., "Low power high-responsivity CMOS temperature sensor," IEEE International Instrumentation and Measurement Technology Conference, May 12-15, 2008; 5 pages.
De Venuto, D. et al., "Low power smart sensor for accurate temperature measurements," 4th IEEE International Workshop on Advances in Sensors and Interfaces, Jun. 28-29, 2011; pp. 71-76.

Djemouai, A. et al., "A 200 MHz frequency-locked loop based on new frequency-to-voltage converters approach," IEEE International Symposium on Circuits and Systems, Jul. 1999; pp. 89-92.
Aita, A. et al., "Low-power and accurate operation of a CMOS smart temperature sensor based on bipolar devices and $\Sigma\Delta$ A/D converter," Research in Microelectronics and Electronics Conference, Jul. 2-5, 2007; pp. 133-136.
Anderson et al.; "Tamper Resistance—A Cautionary Note"; Proceedings of the UNENIX Workshop of Electronic Commerce, XP000923039; Nov. 1, 1966; pp. 1-11.
Assaad, M. et al., "Ultra low power, harsh environment SOI-CMOS design of temperature sensor based threshold detection and wake-up IC," IEEE International SOI Conference, Oct. 11-14, 2010; pp. 1-2.
Bakker, A. et al., "Micropower CMOS temperature sensor with digital output," IEEE Journal of Solid-State Circuits, vol. 31, issue 7, Jul. 1996; pp. 933-937.
Bar-El, Hagai et al.; "The Sorcerer's Apprentice Guide to Fault Attacks"; Internet Citation, XP002329915; Retrieved from the Internet: URL http://web.archive.org/web/20041016071838/eprint.iacr.org/2004-100; Retrieved May 27, 2005.
Djemouai, A. et al., "High performance integrated CMOS frequency-to-voltage converter," Proceedings of the 10th International Conference on Microelectronics; Dec. 14-16, 1998; pp. 63-66.
Falconi, C. et al., "Low voltage, low power, compact, high accuracy, high precision PTAT temperature sensor for deep sub-micron CMOS systems," IEEE International Symposium on Circuits and Systems, May 18-21, 2008; pp. 2102-2105.
Kaya, T. et al., "A Low-Voltage Temperature Sensor for Micro Power Harvesters in Silicon-on-Sapphire CMOS," Electronics Letters, vol. 42, No. 9, Apr. 27, 2006; 2 pages.
Koemmerling et al.; "Design Principles for Tamper-Resistant Smartcard Processors"; USENIX Workshop on Smartcard Technology, XP000982208; May 1, 1999; pp. 9-20.
Lin, C. et al., "Design of frequency-to-voltage converter using successive-approximation technique," Proceedings of the 20th IEEE Instrumentation and Measurement Technology Conference; May 20-22, 2003; pp. 1438-1443.
Zhai, Y. et al,. "Detection of on-chip temperature gradient using a 1.5V low power CMOS temperature sensor," IEEE International Symposium on Circuits and Systems, May 21-24, 2006, pp. 1171-1174.
Lin, Y. et al., "An ultra low power 1V, 220nW temperature sensor for passive wireless applications," IEEE Custom Integrated Circuits Conference, Sep. 21-24, 2008, pp. 507-510.
Liu, Y. et al., "A Low Power Temperature Sensor for Passive RFID Tag," Proceedings of the 2009 12th International Symposium on Integrated Circuits, Dec. 14-16, 2009, pp. 699-702.
Matsumoto, H. et al., "Switched-capacitor frequency-to-voltage and voltage-to-frequency converters based on charge-balancing principle," IEEE International Symposium on Circuits and Systems; Jun. 7-9, 1988; pp. 2221-2224.
Michaelsen, J.A. et al., "A low-voltage low-power frequency-to-voltage converter for VCO feedback linearization," 17th IEEE International Conference on Electronics, Circuits, and Systems, Dec. 12-15, 2010; pp. 1132-1135.
Qian, J., "Design of a 0.8V low power CMOS temperature sensor for RFID-based train axle temperature measurement," 10th IEE International Conference on Solid-State and Integrated Circuit Technology, Nov. 1-4, 2010, 3 pages.
Rossi, C. et al., "Ultra-low power CMOS cells for temperature sensors," SBCCI 2005, Sep. 4-7, 2005; pp. 202-206.
Shenghua, Z. et al., "A novel ultra low power temperature sensor for UHF RFID tag chip," IEEE Asian Solid-State Circuits Conference, Nov. 12-14, 2007; pp. 464-467.
Tuthill, M. "A switched-Current, Switched-Capacitor Temperature Sensor in 0.6-um CMOS", IEEE Journal of Solid-State Circuits, Jul. 1998, vol. 33, pp. 1117-1122.
US Department of Commerce; "Security Requirements for Cryptographic Modules"; Federal Information Processing Standards Publications, National Institute of Technology; FIPS PUB 140-1; Jan. 11, 1994.

* cited by examiner

METHOD AND APPARATUS FOR LIMITING ACCESS TO AN INTEGRATED CIRCUIT (IC)

CROSS-REFERENCE TO RELATED APPLICATION(S)

The present application is a continuation of U.S. patent application Ser. No. 13/566,363, entitled "METHOD AND APPARATUS FOR LIMITING ACCESS TO AN INTEGRATED CIRCUIT (IC)" filed on Aug. 3, 2012, the entirety of which is herein incorporated by reference.

BACKGROUND

Field of the Disclosure

The present disclosure relates generally to electronic devices, and more particularly, to monitoring conditions of an integrated circuit.

Description of the Related Art

Electronic devices often contain information for which access may be desired to be limited. For example, it may be desirable to securely store software in a device to be executed such that the software is not allowed to be read from external the device. As another example, it may be desirable to store configuration parameters and/or user data in a device such that this information is not allowed to be accessed from external the device. For example, a security bit can be provided which may be programmed to prevent reading of information from a device. However, more sophisticated attacks on devices attempt to place the device in an abnormal state where traditional protection techniques may be rendered ineffective.

BRIEF DESCRIPTION OF THE DRAWINGS

The present disclosure may be better understood, and its numerous features and advantages made apparent to those skilled in the art by referencing the accompanying drawings.

DETAILED DESCRIPTION

A low power integrated circuit (IC) die monitoring system is described that comprises at least one of a voltage abnormality tamper detector, a temperature abnormality tamper detector, and a clock abnormality tamper detector. The voltage abnormality tamper detector, the temperature abnormality tamper detector, and the clock abnormality tamper detector operate with low power consumption. For example, individually or together they can use less than 5 microwatts. The various abnormality tamper detectors can detect abnormally low conditions, abnormally high conditions, or both abnormally high and low conditions. As an example, an abnormally low voltage and an abnormally high voltage may be detected. As another example, an abnormally low temperature and an abnormally high temperature may be detected. The clock detector may detect one or more of low clock frequencies, high clock frequencies, clocks stopped in a low state, clocks stopped in a high logic state. Furthermore, the clock detector may detect an abnormal duty cycle of a clock signal. A sampled bandgap reference may be used to reduce power consumption while periodically providing accurate signal references, e.g., current and voltage signal references, while consuming a minimal amount of power. Upon detection of one or more abnormal parameter values, one or more indications may be provided to initiate one or more countermeasures that limit access to the IC in response to determining one or more parameter values are abnormal. As an example, limiting the access to the IC may comprises at least one of: inhibiting a external signal line of the IC, inhibiting execution of an instruction in the IC, resetting at least a portion of the IC, disabling reading of at least a portion of a memory array of the IC, and disabling execution of instructions stored in at least a portion of the memory array of the IC As an example, at least one embodiment may be directed to detecting and responding to tampering with the IC.

Figure 1:
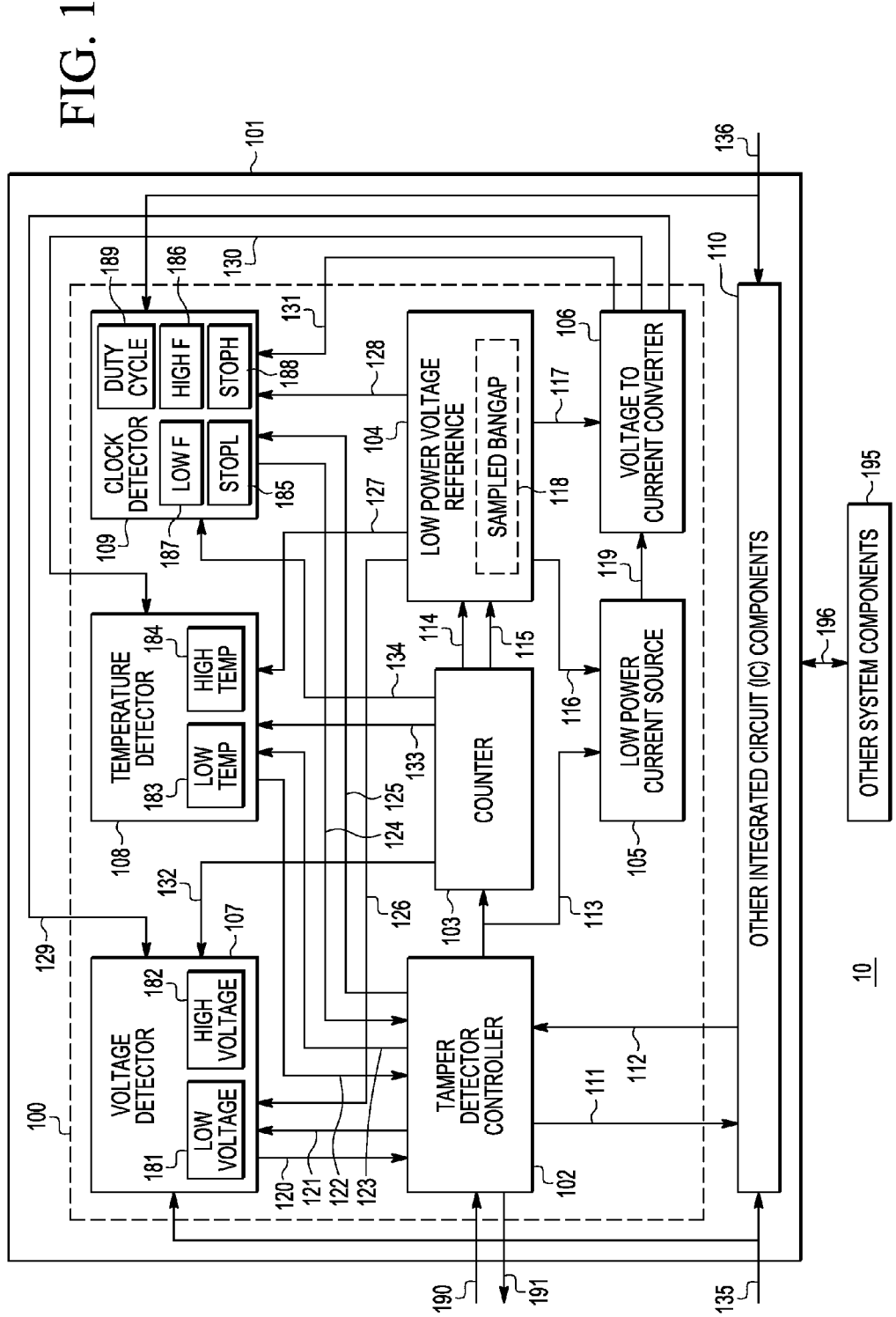
FIG. 1 is a block diagram illustrating an integrated circuit (IC) comprising a tamper detector in accordance with at least one embodiment.

FIG. 1 is a block diagram illustrating an embodiment of a system device 10 that includes an IC 101 and other system components 195. IC 101 is connected to the other system components 195 via connection 196. The illustrated embodiment of IC 101 comprises tamper detector 100 and other IC components 110. Tamper detector 100 comprises tamper detector controller 102, counter 103, low power voltage reference 104, low power current source 105, voltage-to-current converter 106, voltage detector 107, temperature detector 108, and clock detector 109. Voltage detector 107 comprises a low voltage detector 181 and a high voltage detector 182. Temperature detector 108 comprises a low temperature detector 183 and a high temperature detector 184. Clock detector 109 comprises a low clock frequency detector 187, a high clock frequency detector 186, a clock stopped low detector 185, and a clock stopped high detector 188. In accordance with at least one embodiment, clock detector 109 may comprise duty cycle detector 189, which may, for example, comprise a low duty cycle detector and a high duty cycle detector. Low power voltage reference 104 comprises a sampled bandgap reference 118.

Tamper detector controller 102 controls the operation of other components of tamper detector 100. Counter 103 provides timing and enablement signals to coordinate operation of components of tamper detector 100. Low power voltage reference 104 provides at least one reliable, accurate reference voltage regardless of variation of one or more supply voltages provided to IC 101. Low power current source 105 provides reasonably accurate reference currents to voltage to current converter 106, which uses the at least one reliable, accurate reference voltage of low power voltage reference 104 to improve the accuracy of the reasonably accurate reference currents of low power current source 105 so as to provide highly accurate reference currents to other components of tamper detector 100. Voltage detector 107 provides detection of abnormally low voltages using low voltage detector 181 and of abnormally high voltages using high voltage detector 182. Temperature detector 108 provides detection of abnormally low temperatures using low temperature detector 183 and of abnormally high temperatures using high temperature detector 184. Clock detector 109 provides detection of abnormally low frequency clock signals using low frequency clock detector 187, of abnormally high frequency clock signals using high frequency clock detector 186, of a clock stopped at a low logic level using clock stopped low detector 185, of a clock stopped at a high logic level using clock stopped high detector 188, of an abnormally low clock duty cycle or an abnormally high clock duty cycle using duty cycle detector 189, of the like, or of some combination thereof. Clock stopped low detector 185 and clock stopped high detector 188 assure the capability of reliably detecting a stopped clock regardless of the state in which the clock has stopped and provide signals that distinguish the state at which the clock is stopped.

A connection 120 connects voltage detector 107 to tamper detector controller 102. A connection 121 connects tamper detector controller 102 to voltage detector 107. A connection 122 connects temperature detector 108 to tamper detector controller 102. A connection 123 connects tamper detector controller 102 to temperature detector 108. A connection 124 connects clock detector 109 to tamper detector controller 102. A connection 125 connects tamper detector controller 102 to clock detector 109. A connection 111 connects tamper detector controller 102 to other IC components 110. A connection 112 connects other IC components 110 to tamper detector controller 102. A connection 190 connects external single sources to tamper detector controller 102. A connection 191 connects tamper detector controller 102 externally. Tamper detector controller 102 is connected to counter 103 and to low power current source 105 via connection 113.

Tamper detector controller 102 may receive external signals, for example via connection 190, may provide signals externally, for example via connection 191, may provide signals to other IC components 110, for example via connection 111, and/or may receive signals from other IC components 110, for example via connection 112. Signals generated internal to, or external from, tamper detector controller 102 can be used, for example, to control the operation of the tamper detector. For example, signals may be used to disable the tamper detector during times when it might be falsely triggered and to enable the tamper detector at other times. For example, signals to tamper detector controller 102 may be used to disable clock detector 109, or at least one or more portions of clock detector 109, during a time when a clock oscillator is becoming stabilized during start-up. For example, signals received by tamper detector controller 102 may be used to disable low frequency clock detector 187 and high frequency clock detector 186, while leaving other detectors enabled, such as clock stopped low detector 185, and clock stopped high detector 188. After the clock oscillator is expected to be stabilized, signals received by tamper detector controller 102 may be used to enable the disabled detectors.

Counter 103 is connected to low power voltage reference 104 via connections 114 and 115. Low power voltage reference 104 is connected to low power current source 105 via connection 116. Low power voltage reference 104 is connected to voltage to current converter 106 via connection 117. Low power current source 105 is connected to voltage to current converter 106 via connection 119. Counter 103 is connected to voltage detector 107 via connection 132. Counter 103 is connected to temperature detector 108 via connection 133. Counter 103 is connected to clock detector 109 via connection 134. Low power voltage reference 104 is connected to voltage detector 107 via connection 126. Low power voltage reference 104 is connected to temperature detector 108 via connection 127. Low power voltage reference 104 is connected to clock detector 109 via connection 128. Voltage to current converter 106 is connected to voltage detector 107 via connection 129. Voltage to current converter 106 is connected to temperature detector 108 via connection 130. Voltage to current converter 106 is connected to clock detector 109 via connection 131. While connections 129, 130, and 131 are illustrated as single connections for each voltage detector 107, temperature detector 108, and clock detector 109, it should be understood that voltage to current converter 106 may provide many instances of reference current sources, one or more of which may be provided to each of voltage detector 107, temperature detector 108, and clock detector 109. A power supply voltage is supplied from an external voltage source via voltage input 135 to voltage detector 107 and to other IC components 110. As an example, the power supply voltage may be supplied to IC 101 to provide power to IC 101 generally (e.g., to all blocks of IC 101). A clock signal is supplied from an external clock source via clock input 136.

Tamper detector controller 102 controls elements of tamper detector 100, such as counter 103. Tamper detector controller 102 can also control enablement and disablement of voltage detector 107, temperature detector 108, and clock detector 109 on an individual basis. Counter 103 provides timing and control signals for other elements of tamper detector 100. For example, counter 103 provides signals to enable a bandgap reference and to enable storage in a storage capacitor, e.g., charging the storage capacitor, of the reference voltage provided by the bandgap reference. Multiple storage capacitors may be used to store multiple reference voltages. Low power current source 105 provides a small bias current, which need not be highly regulated, to voltage-to-current converter 106 that converts a reference voltage from low power voltage reference 104 to provide highly regulated bias currents, which may, for example, be only a few nanoamperes, thereby minimizing power consumption. As an example, the highly regulated bias currents provided by voltage-to-current converter 106 may be in the range of 10 to 100 nanoamperes. As an example, low power current source 105 can be designed to provide a small bias current which may vary +/−30% over voltage, temperature, and power supply. As an example, voltage-to-current converter 106 can be designed to provide highly regulated bias currents compensated in temperature within +/−2% over the entire temperature range (e.g., −50° C. to +150° C.) and to have a variation with power supply of less than +/−1%. Variations with process of the highly regulated bias currents provided by voltage-to-current converter 106 may be compensated by trimming in the tamper detectors.

In an embodiment where tamper detector controller 102 is not present, signals depicted as being transmitted and received by tamper detector controller 102 may be passed across what is depicted as tamper detector controller 102. For example, counter 103 and low power current source 105 may be controlled by signals received along connections 190 and/or 112, which may, for example, be connected to connection 113. As another example, voltage detector 107, temperature detector 108, and/or clock detector 109 (or at least a portion of clock detector 109) may be enabled and disabled by signals received along connections 121, 123, and/or 125, respectively, for example, based on signals received along connections 190 and/or 112. Tamper indications received from voltage detector 107, temperature detector 108, and/or clock detector 109 may be communicated to tamper detector controller 102, for example, via connections 120, 122, and/or 124, respectively, and tamper detector controller 102 may provide tamper indications over connection 191 to at least one external device and/or over connection 111 to other IC components 110 within IC 101. Such at least one external device and/or other IC components 110 may initiate countermeasures to prevent access to sensitive portions of IC 101 upon reception of tamper detection indicia. In absence of tamper detector controller 102, tamper indications may be communicated, for example from voltage detector 107 through connection 120, from temperature detector 108 through connection 122, and/or from clock detector 109 through connection 124 to connection 191 and/or to connection 111.

Figure 2:
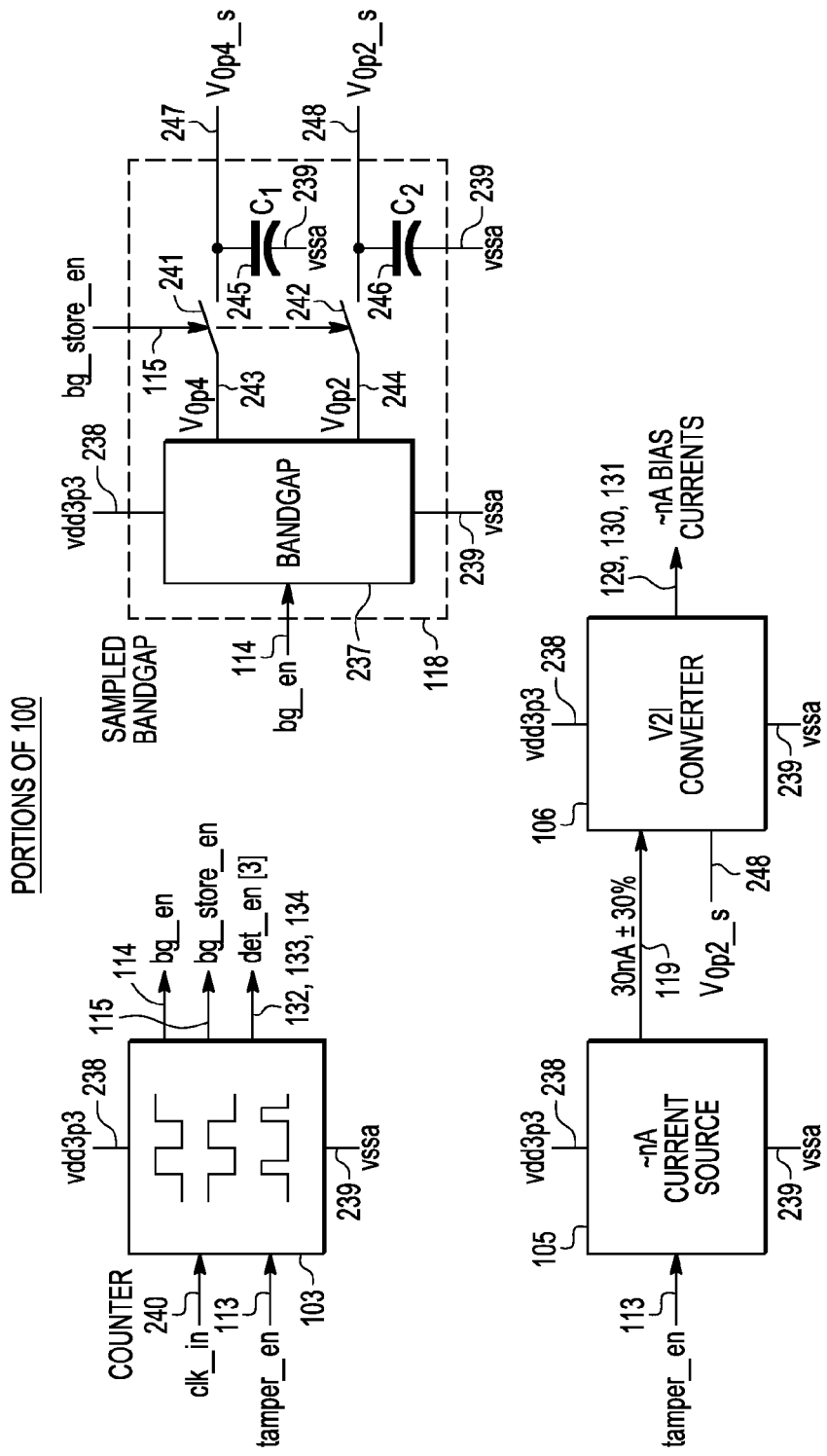
FIG. 2 is a block diagram illustrating a control and reference subsystem of an IC tamper detector in accordance with at least one embodiment.

FIG. 2 is a block diagram illustrating a particular embodiment of portions of a control and reference subsystem of an IC tamper detector 100 of FIG. 1 in accordance with at least one embodiment. The control and reference subsystem of FIG. 2 comprises a counter 103, a sampled bandgap reference 118, a low power current source 105, and a voltage to current converter 106. A positive supply voltage 238 and a negative supply voltage 239 are connected to counter 103, to sampled bandgap reference 118, to low power current source 105, and to voltage to current converter 106.

Counter 103 receives an input signal via connection 113, for example, a tamper detector enable signal labeled tamper_en, which may, for example, be received from tamper detector controller 102 of FIG. 1. Counter 103 receives a clock signal, labeled clk_in, via clock input 240, which may, for example, be connected to clock input 136 of FIG. 1. Counter 103 provides a bandgap enable signal, labeled bg_en, via connection 114, which may, for example, be connected to low power voltage reference 104 (e.g., sampled bandgap reference 118, which is illustrated in more detail in FIG. 2), as shown in FIG. 1. Counter 103 provides a bandgap store enable signal, labeled bg_store_en, via connection 115, which may be connected to low power voltage reference 104 (e.g., sampled bandgap reference 118, which is illustrated in more detail in FIG. 2), as shown in FIG. 1. Counter 103 provides detector enable outputs via connections 132, 133, and 134, which may, for example, be connected, respectively, to voltage detector 107, temperature detector 108, and clock detector 109, as shown in FIG. 1. Such detector enable outputs may be used to selectively and individually enable and disable voltage detector 107, temperature detector 108, and clock detector 109. For example, temperature detector 108 may be initially enabled on start-up via the detector enable output on connection 133, then, after a supply voltage has stabilized, voltage detector 107 may be enabled via the detector enable output on connection 132, then, after a clock oscillator has stabilized, clock detector 108 may be enabled via the detector enable output on connection 134.

Sampled bandgap reference 118 comprises bandgap reference 237, switch 241, switch 242, capacitor 245, and capacitor 246. Positive supply voltage 238 is connected to bandgap reference 237. Negative supply voltage 239 is connected to bandgap reference 237. A bandgap enable signal labeled bg_en is received by bandgap reference 237 via connection 114. A voltage reference output of bandgap reference 237 is connected to a terminal of switch 241 via connection 243. A voltage reference output of bandgap reference 237 is connected to a terminal of switch 242 via connection 244. Switches 241 and 242 are controlled by a bandgap store enable signal, labeled bg_store_en, received via connection 115, which is connected to switch 241 and to switch 242. Another terminal of switch 241 is connected to a terminal of capacitor 245 and to voltage reference output 247. Another terminal of capacitor 245 is connected to negative supply voltage 239. Another terminal of switch 242 is connected to a terminal of capacitor 246 and to voltage reference output 248. Another terminal of capacitor 246 is connected to negative supply voltage 239.

Low power current source 105 receives a signal tamper enable, labeled tamper_en, via connection 113. Low power current source 105 provides a current source output via connection 119 to voltage to current converter 106. Voltage to current converter 106 receives voltage reference output 248 from sampled bandgap reference 118 via connection 248. Voltage to current converter 106 provides precision bias currents via connections 129, 130, and 131, respectively, to voltage detector 107, temperature detector 108, and clock detector 109 of FIG. 1.

Figure 3:
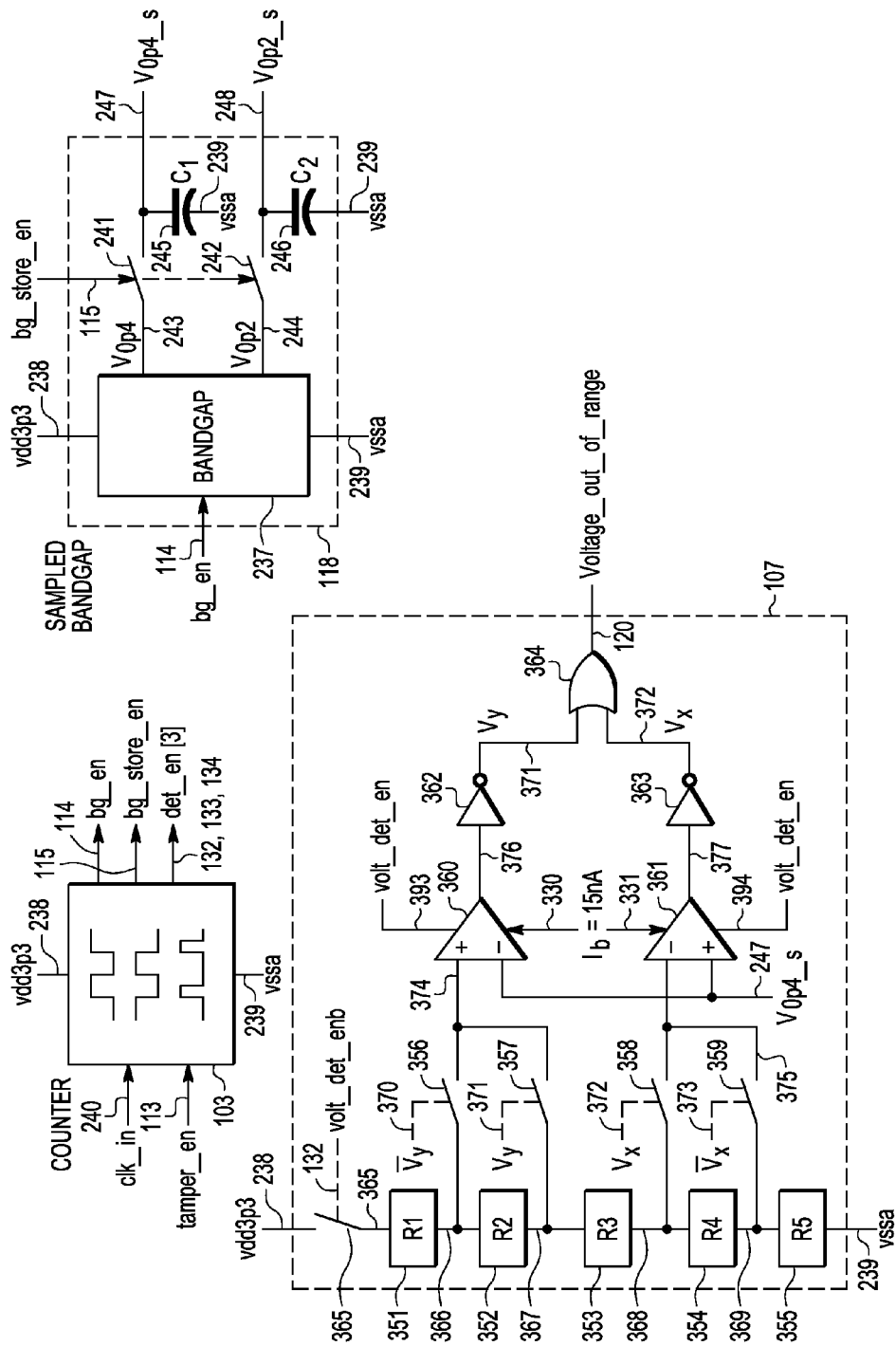
FIG. 3 is a block diagram illustrating a voltage detector and portions of the control and reference subsystem of an IC tamper detector in accordance with at least one embodiment.

FIG. 3 is a block diagram illustrating a particular embodiment of voltage detector 107, counter 103, and sampled bandgap reference 118. Counter 103 and sampled bandgap reference 118 are as described with respect to FIG. 2. The voltage detector 107 comprises a voltage divider comprising resistors 351, 352, 353, 354, and 355. Positive supply voltage 238 is connected to a terminal of switch 365. Switch 365 is controlled by a voltage detector enable signal, labeled volt_det_enb, received via connection 132, which is connected to switch 365. Another terminal of switch 365 is connected to a terminal of resistor 351 via connection 365. Another terminal of resistor 351 is connected to a terminal of resistor 352 and to a terminal of switch 356 via connection 366. Another terminal of resistor 352 is connected to a terminal of resistor 353 and to a terminal of switch 357 via connection 367. Another terminal of resistor 353 is connected to a terminal of resistor 354 and to a terminal of switch 358 via connection 368. Another terminal of resistor 354 is connected to a terminal of resistor 355 and to a terminal of switch 359 via connection 369. Another terminal of resistor 355 is connected to negative supply voltage 239. Switch 356 is controlled by an inverted Vy signal received via connection 370, which is connected to switch 356. Switch 357 is controlled by a Vy signal received via connection 371. Switch 358 is controlled by a Vx signal received via connection 372. Switch 359 is controlled by an inverted Vx signal received via connection 373. Another terminal of switch 356 is connected to another terminal of switch 357 and to a non-inverted input of comparator 360 via connection 374. Another terminal of switch 358 is connected to another terminal of switch 359 and to an inverted input of comparator 361 via connection 375. An inverted input of comparator 360 and a non-inverted input of comparator 361 are connected to voltage reference output 247 of FIG. 2. A reference current source is connected to comparator 360 at node 330. A reference current source is connected to comparator 361 at node 331. An output of comparator 360 is connected to an input of inverter 362 via connection 376. An output of comparator 361 is connected to an input of inverter 363 via connection 377. An output of inverter 362 is connected to an input of OR gate 364 via connection 371. An output of inverter 363 is connected to another input of OR gate 364. An output of OR gate 364 provides a voltage out of range signal, labeled voltage_out_of_range, at connection 120.

Switch 365 allows the voltage detector resistor ladder comprising resistors 351, 352, 353, 354, and 355 to be selectively disabled, thereby reducing power consumption.

In accordance with at least one embodiment, resistors 351, 352, 353, 354, and 355 are fabricated from highly resistive polycrystalline silicon, allowing such resistors to have very high resistance values, minimizing current through the voltage divider comprising resistors 351, 352, 353, 354, and 355. Comparator 360 detects if the positive supply voltage 238 falls below a lower power supply voltage limit determined by the values of resistors 351, 352, 353, 354, and 355 relative to the reference voltage of voltage reference output 247. Switch 357, as controlled by logic signal Vy from node 371, and switch 356, as controlled by a logic signal at node 370, which is the inverse of logic signal Vy from node 371, provide hysteresis for the voltage detection relative to the lower power supply voltage limit. Comparator 361 detects if the positive supply voltage 238 exceeds an upper power supply voltage limit determined by the values of resistors 351, 352, 353, 354, and 355 relative to the reference voltage of voltage reference output 247. Switch 358, as controlled by logic signal Vx from node 372, and switch 359, as controlled by a logic signal at node 373, which is the inverse of logic signal Vx from node 372, provide hysteresis for the voltage detection relative to the upper power supply voltage limit. NOR gate 364 provides a single voltage_out_of_range signal responsive to positive supply voltage 238 being either too low or too high (e.g., either below the lower power supply voltage limit or above the upper power supply voltage limit). If separate signals are desired, logic signal Vx at node 372 may be used to indicate positive power supply voltage 238 being too high (e.g., above the upper power supply voltage limit), and logic signal Vy at node 371 may be used to indicate positive power supply voltage 238 being too low (e.g., below the lower power supply voltage limit).

The comparators 360 and 361 may be enabled and disabled using comparator enable signals controlled by the voltage detector enable signal labeled volt_det_en, which is connected to comparator 360 via connection 393 and to comparator 361 via connection 394. The voltage detector enable signal, volt_det_en, may be provided, for example, by counter 103 or, as another example, by tamper detector controller 102, in which cases counter 103 or tamper detector controller 102 is connected to connections 393 and 394. Providing for comparators 360 and 361 to be enabled and disabled reduces power consumption and provides a well defined condition (i.e., not a low voltage condition and not a high voltage condition) at the comparator outputs of comparators 360 and 361 at connections 376 and 377, respectively, when the voltage detector is disabled. The voltage to current converter 106 provides bias currents 129 to comparators 360 and 361. The bias currents 129 for comparators 360 and 361 are in the range of a few tens of nanoamperes to have low power consumption. In one exemplary embodiment, these bias currents are set to 15 nA.

A trimming capability is provided to add or remove resistors in the voltage divider and move up or down the voltages at connections 366, 367, 368, and 369 to slightly adjust the lower and upper power supply voltage limits. As an example, the trimming capability may be provided by implementing at least one of resistors 351, 352, 353, 354, and 355 as a plurality of resistors wherein at least one resistor of the plurality of resistors is selectively configurable to be in circuit with the remainder of the plurality of resistors or to be removed from the circuit. As an example, non-volatile storage of a bit to enable or disable the resistor may be provided, and such bit may be used to control a transistor configured as an analog switch in series with the resistor to selectively configure the resistor to be in the circuit or out of the circuit. The non-volatile storage of the bit may be accessible and programmable after IC 101 has been manufactured, allowing trimming of the resistors of the voltage divider after IC 101 has been installed in a manufactured product. The non-volatile storage of the bit is secured to prevent its unauthorized reprogramming. As another example, the resistors of the voltage divider may be trimmed during production, for example, using selective metalized interconnection of the at least one resistor of the plurality of resistors or, as another example, using laser trimming of a resistor value.

Figure 4:
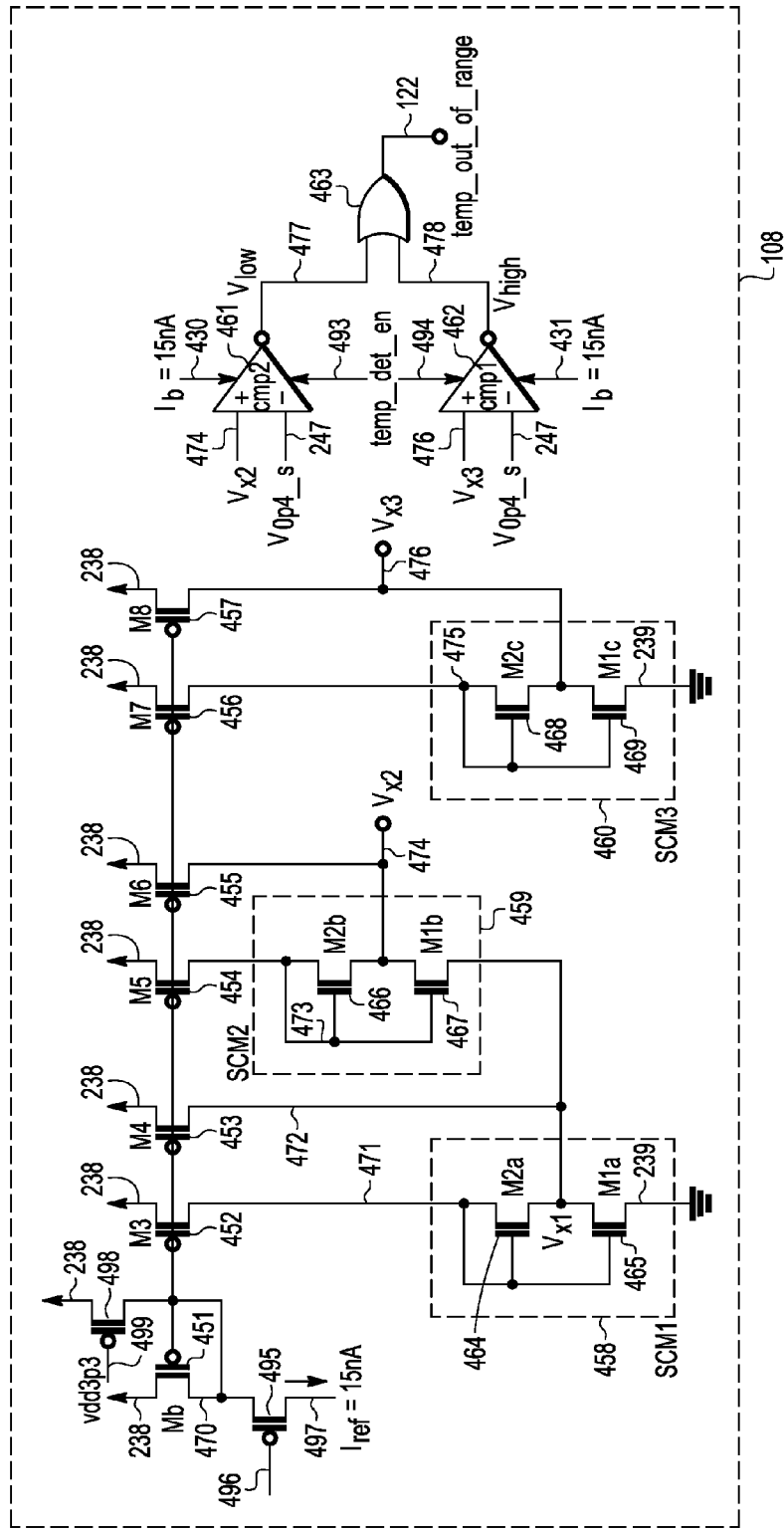
FIG. 4 is a schematic diagram illustrating temperature detector in accordance with at least one embodiment.

FIG. 4 is a schematic diagram illustrating temperature detector in accordance with at least one embodiment. The temperature detector 108 comprises a current mirror, an enable circuit, a plurality of self cascode metal oxide semiconductor field effect transistor (MOSFET) (SCM) circuits, two comparators, and an OR gate. The current mirror comprises p-channel MOSFET 451, p-channel MOSFET 452, p-channel MOSFET 453, p-channel MOSFET 454, p-channel MOSFET 455, p-channel MOSFET 456, and p-channel MOSFET 457. The enable circuit comprises p-channel MOSFET 495 and p-channel MOSFET 498. The plurality of SCM circuits comprises SCM circuit 458, SCM circuit 459, and SCM circuit 460. SCM circuits 458, 459, and 460 provide outputs at their intermediate or middle nodes 472, 474, and 476, respectively, labeled Vx1, Vx2, and Vx3, respectively, whose voltages are proportional to absolute temperature (PTAT). A trimming capability is provided to add current or sink current at nodes 474 and 476 (i.e., Vx2 and Vx3) to slightly adjust a lower temperature limit TL and an upper temperature limit TH. As discussed above with respect to the voltage divider trimming capability of FIG. 3, such trimming capability may be selectively configured using a plurality of selectable elements. The two comparators comprise comparator 461 and comparator 462. Comparator 461 detects if a temperature, as detected by SCM circuits 458 and 459, is below a lower temperature limit TL. Comparator 462 detects if a temperature, as detected by SCM circuit 460, is above an upper temperature limit TH. The OR gate comprises OR gate 463. OR gate 463 provides a single temp_out_of_range signal indicative of the temperature being either below the lower temperature limit TL or above the upper temperature limit TH. If separate signals are desired, a Vlow signal at node 477 may be used to indicate the temperature being below the lower temperature limit TL, and a Vhigh signal at node 478 may be used to indicate the temperature being above the upper temperature limit TH.

A positive supply voltage 238 is connected to a source terminal of p-channel MOSFET 451, to a source terminal of p-channel MOSFET 452, to a source terminal of p-channel MOSFET 453, to a source terminal of p-channel MOSFET 454, to a source terminal of p-channel MOSFET 455, to a source terminal of p-channel MOSFET 456, and to a source terminal of p-channel MOSFET 457. A drain of p-channel MOSFET 451 at node 470 is connected to a source terminal of p-channel MOSFET 495, to a drain terminal of p-channel MOSFET 498, to a gate terminal of p-channel MOSFET 451, to a gate terminal of p-channel MOSFET 452, to a gate terminal of p-channel MOSFET 453, to a gate terminal of p-channel MOSFET 454, to a gate terminal of p-channel MOSFET 455, to a gate terminal of p-channel MOSFET 456, and to a gate terminal of p-channel MOSFET 457. A gate terminal of p-channel MOSFET 495 is connected to an inverted temperature detector enable signal, labeled temp_det_enb, at node 496. A drain terminal of p-channel MOSFET 495 is connected to current reference Iref for the current mirror at node 497. A source terminal of p-channel MOSFET 498 is connected to positive supply voltage 238. A gate terminal of p-channel MOSFET 498 is connected to a temperature detector enable signal, labeled temp_det_en at node 499. P-channel MOSFET 495 functions as a switch controlled by an inverted temperature detector enable signal, labeled temp_det_enb, to disconnect the reference current Iref from the current mirror p-channel MOSFET 451 when the temperature detector is disabled. P-channel MOSFET 498 functions as a switch to connect node 470 to power supply 238 when the temperature detector is disabled to avoid a floating node condition and, eventually, a high power consumption condition. A drain terminal of p-channel MOSFET 452 is connected to a positive terminal of SCM circuit 458 at node 471. A negative terminal of SCM circuit 458 is connected to negative supply voltage 239. A middle terminal of SCM circuit 458 at node 472 is connected to a drain terminal of p-channel MOSFET 453 and to a negative terminal of SCM circuit 459. A drain terminal of p-channel MOSFET 454 is connected to a positive terminal of SCM circuit 459 at node 473. A middle terminal of SCM circuit 459 at node 474 is connected to a drain terminal of p-channel MOSFET 455 and to node 474, which is connected to a non-inverted input of comparator 461. A drain terminal of p-channel MOSFET 456 is connected to a positive terminal of SCM circuit 460 at node 475. A negative terminal of SCM circuit 460 is connected to negative supply voltage 239. A middle terminal of SCM circuit 460 is connected to a drain terminal of p-channel MOSFET 457 and to node 476, which is connected to a non-inverted input of comparator 462.

SCM circuit 458 comprises n-channel MOSFET 464 and n-channel MOSFET 465. The positive terminal of SCM circuit 458 at node 471 is connected to the drain terminal of n-channel MOSFET 464, to the gate terminal of n-channel MOSFET 464, and to the gate terminal of n-channel MOSFET 465. The middle terminal of SCM circuit 458 at node 472 is connected to the source terminal of n-channel MOSFET 464 and to the drain terminal of n-channel MOSFET 465. The negative terminal of SCM circuit 458 is connected to the source terminal of n-channel MOSFET 465.

SCM circuit 459 comprises n-channel MOSFET 466 and n-channel MOSFET 467. The positive terminal of SCM circuit 459 at node 473 is connected to the drain terminal of n-channel MOSFET 466, to the gate terminal of n-channel MOSFET 466, and to the gate terminal of n-channel MOSFET 467. The middle terminal of SCM circuit 459 at node 474 is connected to the source terminal of n-channel MOSFET 466 and to the drain terminal of n-channel MOSFET 467. The negative terminal of SCM circuit 459 is connected to the source terminal of n-channel MOSFET 467.

SCM circuit 460 comprises n-channel MOSFET 468 and n-channel MOSFET 469. The positive terminal of SCM circuit 460 at node 475 is connected to the drain terminal of n-channel MOSFET 468, to the gate terminal of n-channel MOSFET 468, and to the gate terminal of n-channel MOSFET 469. The middle terminal of SCM circuit 460 at node 476 is connected to the source terminal of n-channel MOSFET 468 and to the drain terminal of n-channel MOSFET 469. The negative terminal of SCM circuit 460 is connected to the source terminal of n-channel MOSFET 469.

Voltage reference output 247 from FIG. 2 is connected to the inverted input of comparator 461 and to the inverted input of comparator 462. A reference current source is connected to comparator 461 at node 430. Comparator 461 is connected to positive power supply 238 and to negative supply voltage 239. Comparator 461 may be enabled and disabled by a comparator enable signal controlled by a temperature detector enable signal, labeled temp_det_en, connected to comparator 461 via connection 493, to reduce power consumption by allowing comparator 461 to be disabled when not needed. The comparator 461 enable signal also assures a well defined condition (e.g., not a low temperature condition) at the comparator output of comparator 461 when the voltage detector is disabled. The comparator 461 enable signal may come, as one example, from tamper detector controller 102 in FIG. 1 through connection 123 or, as another example, from counter 103 via connection 133. A reference current source is connected to comparator 462 at node 431. Comparator 462 is connected to positive power supply 238 and to negative supply voltage 239. Comparator 462 may be enabled and disabled by a comparator enable signal, controlled by a temperature detector enable signal, labeled temp_det_en, connected to comparator 462 via connection 494, to reduce power consumption by allowing comparator 462 to be disabled when not needed. The comparator 462 enable signal also assures a well defined condition (e.g., not a high temperature condition) at the comparator output of comparator 462 when the voltage detector is disabled. The comparator 462 enable signal may come, as one example, from tamper detector controller 102 in FIG. 1 through connection 123 or, as another example, from counter 103 via connection 133. An output of comparator 461 is connected to an input of OR gate 463 at node 477. An output of comparator 462 is connected to another input of OR gate 463 at node 478. An output of OR gate 463 provides a temperature out of range signal at connection 122. The voltage to current converter 106 provides bias currents 130 to comparators 461 and 462. The bias currents for comparators 461 and 462 are in the range of a few tens of nanoamperes to have low power consumption. In one exemplary embodiment, this bias current is set to 15 nA.

Figure 5:
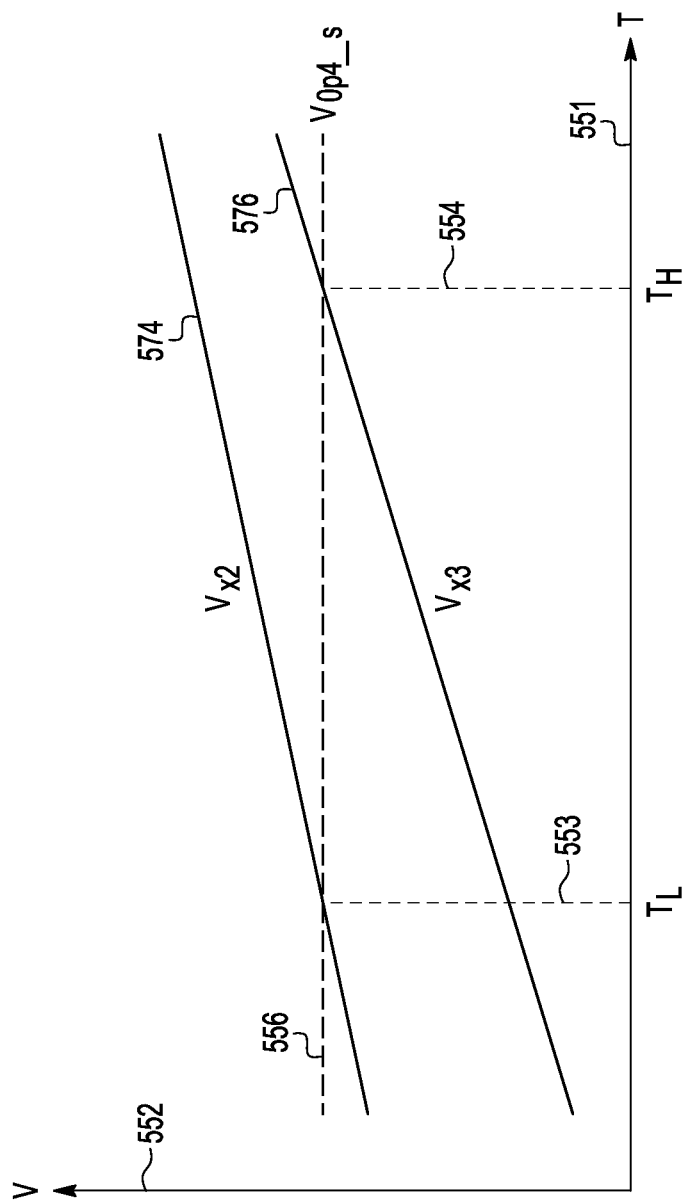
FIG. 5 is a graph illustrating a temperature and voltage relationship of a temperature detector in accordance with at least one embodiment.

FIG. 5 is a graph illustrating a temperature and voltage relationship of a temperature detector in accordance with at least one embodiment. The graph is plotted against horizontal axis 551 and vertical axis 552. Line 574 illustrates a voltage Vx2 at node 474 of FIG. 4. Line 576 illustrates a voltage Vx3 at node 476 of FIG. 4. The linear nature of line 574 illustrates the linear response of the self cascode MOSFET (SCM) circuits 458 and 459 of FIG. 4 to temperature. The linear nature of line 576 illustrates the linear response of SCM circuit 460 of FIG. 4 to temperature. The positive slope of line 574 illustrates the positive relationship of temperature to voltage of SCM circuits 458 and 459. The positive slope of line 576 illustrates the positive relationship of temperature to voltage of SCM circuit 460. Line 574 is illustrated as intersecting horizontal line 556 at a low temperature TL illustrated by vertical line 553. Line 576 is illustrated as intersecting horizontal line 556 at a high temperature TH illustrated by vertical line 554. Horizontal line 556 illustrates a voltage reference output voltage which may be obtained, for example, from voltage reference output 247 of FIG. 2. The horizontal nature of horizontal line 556 illustrates the temperature independence of the voltage reference output voltage since the voltage reference output voltage is obtained from a bandgap voltage reference circuit (e.g., sampled bandgap voltage reference 118 of FIG. 1), in accordance with at least one embodiment. By comparing, for example, using comparator 461 of FIG. 4, voltage Vx2 at node 474 of FIG. 4 to a voltage reference output voltage, for example, from voltage reference output 247 of FIG. 2, temperatures below the low temperature TL can be detected since the comparator 461 is an inverted comparator. By comparing, for example, using comparator 462 of FIG. 4, voltage Vx3 at node 476 of FIG. 4 to a voltage reference output voltage, for example, from voltage reference output 247 of FIG. 2, temperatures above the high temperature TH can be detected since the comparator 462 is an inverted comparator.

Figure 6:
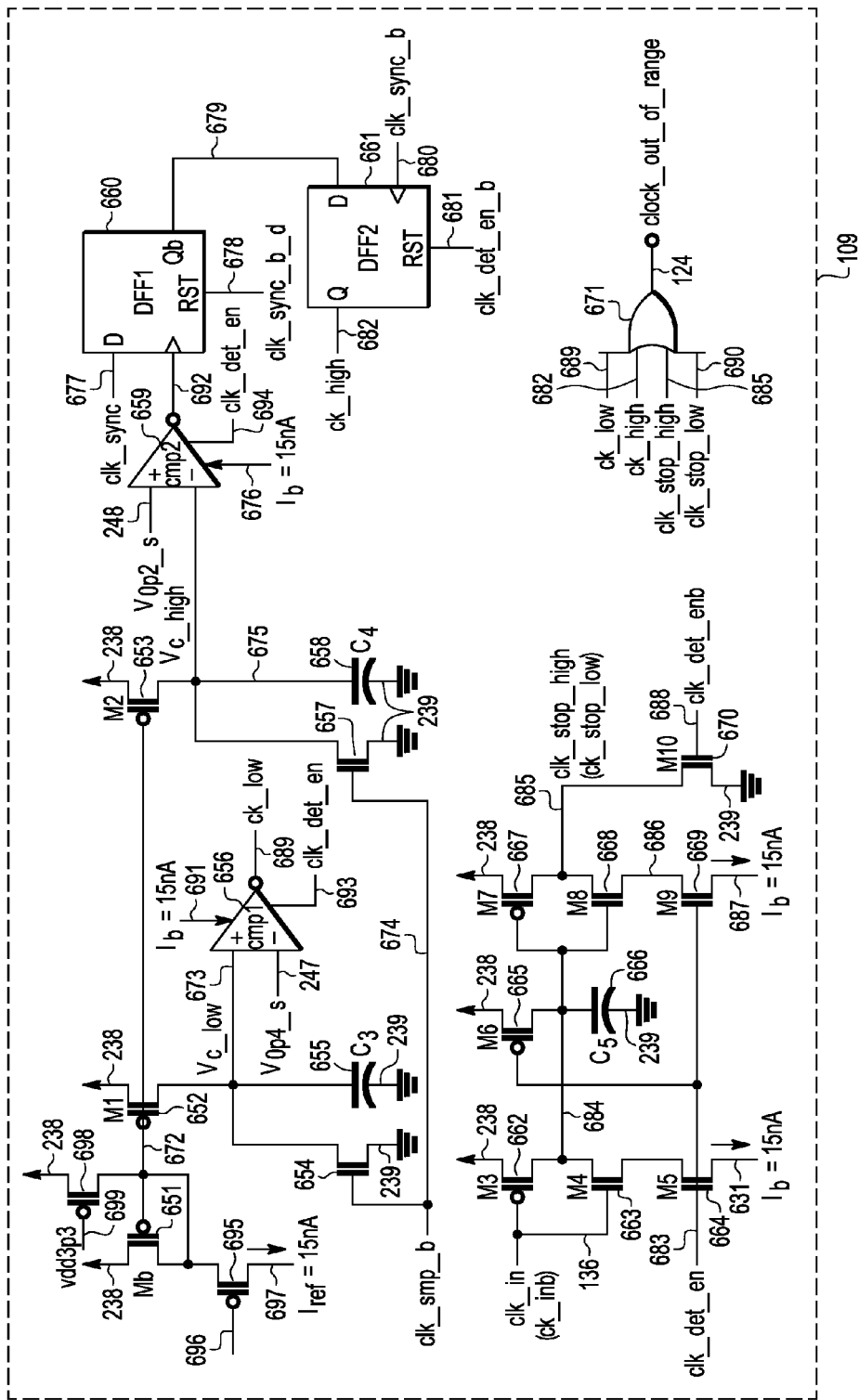
FIG. 6 is a schematic diagram illustrating a clock detector in accordance with at least one embodiment.

FIG. 6 is a schematic diagram illustrating a clock detector in accordance with at least one embodiment. Clock detector 109 comprises p-channel MOSFET 651, p-channel MOSFET 695, p-channel MOSFET 698, p-channel MOSFET 652, p-channel MOSFET 653, n-channel MOSFET 654, capacitor 655, comparator 656, n-channel MOSFET 657, capacitor 658, comparator 659, D flip-flop 660, D flip-flop 661, p-channel MOSFET 662, n-channel MOSFET 663, n-channel MOSFET 664, p-channel MOSFET 665, capacitor 666, p-channel MOSFET 667, n-channel MOSFET 668, n-channel MOSFET 669, n-channel MOSFET 670, and NOR gate 671. A positive supply voltage 238 is connected to the source terminal of p-channel MOSFET 651, to the source terminal of p-channel MOSFET 652, to the source terminal of p-channel MOSFET 653, to the source terminal of p-channel MOSFET 662, to the source terminal of p-channel MOSFET 665, and to the source terminal of p-channel MOSFET 667. A drain terminal of p-channel MOSFET 651 is connected to a source terminal of p-channel MOSFET 695, to a drain terminal of p-channel MOSFET 698, to the gate terminal of p-channel MOSFET 651, to the gate terminal of p-channel MOSFET 652, and to the gate terminal of p-channel MOSFET 653 at node 672. P-channel MOSFETs 651, 652, and 653 form a current mirror to provide currents through p-channel MOSFETs 652 and 653 based on the current through p-channel MOSFET 651, which is determined by the current of the reference current source connected to the drain terminal of p-channel MOSFET 651. A drain terminal of p-channel MOSFET 695 is connected to a reference current source at node 697. A gate terminal of p-channel MOSFET 695 is connected to an inverted clock detector enable signal clk_det_enb at node 696. A source terminal of p-channel MOSFET 698 is connected to positive supply voltage 238. A gate terminal of p-channel MOSFET 698 is connected to a clock detector enable signal clk_det_en at node 699. P-channel MOSFET 695 functions as a switch controlled by an inverted clock detector enable signal, labeled clk_det_enb, to disconnect the reference current Iref from the current mirror when the clock detector is disabled. P-channel MOSFET 698 functions as a switch to connect node 672 to power supply 238 when the clock detector is disabled to avoid a floating node condition and, eventually, a high power consumption condition.

The drain terminal of p-channel MOSFET 652 is connected to a drain terminal of n-channel MOSFET 654, to a terminal of capacitor 655, and to a non-inverted input of comparator 656 at node 673. An inverted input of comparator 656 is connected to a reference voltage, for example, the reference voltage output 247 of FIG. 2. A reference current source is connected to reference current source input 691 of comparator 656. Comparator 656 provides a clock frequency low signal ck_low at comparator output 689 when the clock frequency is detected as being low. A clock sampling signal clk_smp_b, which may be an inverted version of a clock sampling signal clk_smp, is connected at node 674 to the gate terminal of n-channel MOSFET 654 and to the gate terminal of re-channel MOSFET 657. A negative supply voltage, for example, negative supply voltage 239 of FIG. 2, is connected to the source terminal of n-channel MOSFET 654 and to another terminal of capacitor 655. A drain terminal of p-channel MOSFET 653 is connected to a drain terminal of n-channel MOSFET 657, to a terminal of capacitor 658, and to an inverted input of comparator 659 at node 675. A negative supply voltage, for example, negative supply voltage 239 of FIG. 2, is connected to the source terminal of re-channel MOSFET 657 and to another terminal of capacitor 658. A reference voltage, for example, reference voltage output 248 of FIG. 2, is connected to the non-inverted input of comparator 659. A reference current source is connected to reference current input 676 of comparator 659. Comparator output 692 of comparator 659 is connected to a clock input of D flip flop 660. A clock synchronization signal clk_sync is provided to D input 677 of D flip flop 660. A delayed inverted clock synchronization signal clk_sync_b_d is provided to a reset input 678 of D flip flop 660. The delay between the inverted clock synchronization signal clk_sync_b and the delayed inverted clock synchronization signal clk_sync_b_d is a few nanoseconds. An inverted Qb output of D flip flop 660 is connected to a D input of D flip flop 661 at node 679. An inverted clock synchronization signal clk_sync_b, which may be an inverted version of a clock synchronization clk_sync, is provided to a clock input 680 of D flip flop 661. An inverted clock detector enable signal clk_det_en_b, which may be an inverted version of a clock detector enable signal clk_det_en, is provided to a reset input 681 of D flip flop 661. D flip flop 661 provides a clock frequency high signal ck_high at Q output 682 when the clock frequency is detected as being high.

A clock input signal clk_in is provided at connection 136 of FIG. 1, which is connected to the gate terminal of p-channel MOSFET 662 and to the gate terminal of re-channel MOSFET 663. The drain terminal of p-channel MOSFET 662 at node 684 is connected to the drain terminal of n-channel MOSFET 663, to the drain terminal of p-channel MOSFET 665, to a terminal of capacitor 666, to the gate terminal of p-channel MOSFET 667, and to the gate terminal of n-channel MOSFET 668. Another terminal of capacitor 666 is connected to a negative supply voltage, such as negative supply voltage 239 of FIG. 2. A source terminal of n-channel MOSFET 663 is connected to a drain terminal of n-channel MOSFET 664. A source terminal of n-channel MOSFET 664 is connected to a reference current source at node 631. A clock detector enable signal clk_det_en at node 683 is connected to a gate terminal of n-channel MOSFET 664, to a gate terminal of p-channel MOSFET 665, and to a gate terminal of n-channel MOSFET 669. A reference current source is connected to reference current source input 687, which is connected to a source terminal of n-channel MOSFET 669. A drain terminal of n-channel MOSFET 669 is connected to a source terminal of n-channel MOSFET 668 at node 686. A drain terminal of n-channel MOSFET 668 at node 685 is connected to a drain terminal of p-channel MOSFET 667 and to a drain terminal of n-channel MOSFET 670. Node 685 provides a clock stopped high signal clk_stop_high. An inverted clock detector enable signal clk_det_enb at node 688 is provided to a gate terminal of n-channel MOSFET 670. A negative supply voltage, for example, negative supply voltage 239 of FIG. 2, is connected to a source terminal of n-channel MOSFET 670.

Another instantiation of the circuit comprising p-channel MOSFET 662, re-channel MOSFET 663, n-channel MOSFET 664, p-channel MOSFET 665, capacitor 666, p-channel MOSFET 667, n-channel MOSFET 668, n-channel MOSFET 669, and re-channel MOSFET 670 may be provided, but with the clock input signal clk_in at connection 136 replaced with an inverted clock input signal ck_inb to provide at node 690 a clock stopped low signal clk_stop_low. Thus, indications can be provided to indicate when the clock has stopped at a high logic level (when the clock stopped high signal clk_stop_high is asserted) and when the clock has stopped at a low logic level (when the clock stopped low signal clk_stop_low is asserted).

The clock frequency low signal clk_low is applied to input 689 of NOR gate 671. The clock frequency high signal clk_high from Q output 682 of D flip flop 661 is applied to another input 682 of NOR gate 671. The clock stopped high signal clk_stop_high from node 685 is applied to yet another input of NOR gate 671. The clock stopped low signal clk_stop_low from a node analogous to node 685 but in another instantiation of a stopped clock detection circuit receiving inverted clock input signal ck_inb instead of clock input signal clk_in is applied to a further input 690 of NOR gate 671. NOR gate 671 provides a clock out of range signal clock_out_of_range at connection 124 of FIG. 1.

In accordance with at least one embodiment, clock detector 109 does not need to be enabled continuously. Rather, clock detector 109 may be enabled for some clock cycles and disabled for other clock cycles. As an example, clock detector 109 may be enabled for a single clock cycle and disabled for a plurality of clock cycles, thereby providing clock detection functionality at very low power consumption. By intermittently enabling and disabling clock detector 109, power savings may be realized. Since clock detector 109 detects abnormal clock conditions and intermittent enablement of clock detector 109 introduces discontinuities in the monitoring of the clock signal, the output of clock detector 109 may be disregarded not only when clock detector 109 is disabled but also for a short time after clock detector 109 has been re-enabled to allow clock detector 109 to reliably detect clock conditions. Reliable detection of clock conditions is assured by proper timing of clk_det_en, clk_smp, clk_sync, and clk_sync_d signals and their inverted versions.

Clock detector 109 comprises a current mirror comprising p-channel MOSFET 651, p-channel MOSFET 652, and p-channel MOSFET 653. An inverted clock sample signal clk_smp_b at node 674 controls n-channel MOSFETs 654 and 657. When inverted clock sample signal clk_smp_b at node 674 is at a low logic level, current through p-channel MOSFET 652 charges capacitor 655. When inverted clock sample signal clk_smp_b at node 674 is at a high logic level, n-channel MOSFET 654 discharges capacitor 655. Inverted clock sample signal clk_smp_b remains high for a given number of clock cycles and goes low for just one clock period. The number of clock cycles clk_smp_b signal remains high is defined by the tamper detector controller and the counter in FIG. 1. A simple binary counter may be used to count $2^N$ clock cycles and release the circuit to evaluate one clock period each such $2^N$ clock cycles. As long as inverted clock sample signal clk_smp_b at node 674 achieves a low logic level during one clock period and such time period is short enough to prevent capacitor 655 from charging above the reference voltage of voltage reference output 247, comparator 656 doesn't indicate a slow clock signal by de-asserting or driving low the signal ck_low at comparator output 689. However, if the clock signal is abnormally slow, the low logic level of inverted clock sample signal clk_smp_b will remain for one clock period and such time period will be long enough to allow capacitor 655 to be charged above the reference voltage of voltage reference output 247 of FIG. 2. In such case, comparator 656 detects the clock signal as having a clock frequency below a lower clock frequency limit and provides a low clock frequency indication via assertion of signal ck_low at comparator output 689.

Similarly, capacitor 658 is charged by the current through p-channel MOSFET 653 when inverted clock sample signal clk_smp_b is at a low logic level and is discharged through n-channel MOSFET 657 when inverted clock sample signal clk_smp_b is at a high logic level. When the low logic level of inverted clock sample signal clk_smp_b occurs each $2^N$ clock cycles during just one clock cycle and such time period is long enough capacitor 658 is charged sufficiently to allow node 675 to rise above the reference voltage of voltage reference output 248 of FIG. 2. However, if inverted clock sample signal clk_smp_b is low for one clock cycle each $2^N$ clock cycles and such time period is short enough, capacitor 658 is not allowed sufficient time to charge and node 675 does not exceed the reference voltage of voltage reference output 248 of FIG. 2. Thus, comparator output 692 of comparator 659 does not clock a value of clock synchronization signal clk_sync into D input 677 of D flip flop 660. Clock synchronization signal clk_sync at D input of D flip flop 660 is high during just one clock period each $2^N$ clock cycles and is synchronized with inverted clock sample signal clk_smp_b. Rather, inverted and delayed clock synchronization signal clk_sync_b_d at reset input 678 of D flip flop 660 resets D flip flop 660 and inverted clock synchronization signal clk_sync_b clocks the inverted output Qb of D flip flop 660 at node 679 through D flip flop 661 unless inverted clock detector enable signal clk_det_en_b has disabled clock detector 109 by resetting D flip flop 661, driving low the outputs of comparators 656 and 659, as well as driving low nodes 685 and 690 of clock stopped at high and clock stopped at low circuits, respectively. Thus, if the clock signal has a clock frequency that exceeds an upper clock frequency limit, a clock high signal ck_high at Q output 682 of D flip flop 661 provides an indication of that condition.

The comparators 656 and 659 may be enabled and disabled using comparator enable signals controlled by the clock detector enable signal labeled clk_det_en, which are connected to comparator 656 via connection 693 and to comparator 659 via connection 694. The clock detector enable signal, clk_det_en, may be provided, for example, by counter 103 or, as another example, by tamper detector controller 102, in which cases counter 103 or tamper detector controller 102 is connected to connections 693 and 694. Providing for comparators 656 and 659 to be enabled and disabled reduces power consumption and provides a well defined condition (i.e., not a slow clock condition and not a fast clock condition) at the comparator outputs of comparators 656 and 659 at connections 689 and 692, respectively, when the clock detector is disabled. The voltage to current converter 106 provides bias currents 131 to comparators 656 and 659. The bias currents 131 for comparators 656 and 659 are in the range of a few tens of nanoamperes to have low power consumption. In one exemplary embodiment, these bias currents are set to 15 nA.

A trimming capability is provided to add or remove additional capacitors 655 and 658 to slightly adjust the low and high clock frequency limits. As an example, the trimming capability may be provided by implementing at least one of capacitors 655 and 658 as a plurality of capacitors wherein at least one capacitor of the plurality of capacitors is selectively configurable to be in circuit with the remainder of the plurality of capacitors or to be removed from the circuit. As an example, non-volatile storage of a bit to enable or disable the capacitor may be provided, and such bit may be used to control a transistor configured as an analog switch in series with the capacitor to selectively configure the capacitor to be in the circuit or out of the circuit. The non-volatile storage of the bit may be accessible and programmable after IC 101 has been manufactured, allowing trimming of the capacitors of the clock detector after IC 101 has been installed in a manufactured product. The non-volatile storage of the bit is secured to prevent its unauthorized reprogramming. As another example, the capacitors of the clock detector may be trimmed during production, for example, using selective metalized interconnection of the at least one capacitor of the plurality of capacitor or, as another example, using laser trimming of a capacitor value.

Counter 103 may be used to provide signals to coordinate operation of clock detector 109. A clock sample signal, labeled clk_smp, and a clock synchronization signal, labeled clk_sync, may be similarly generated from a $2^N$ counter gated by a clock input signal, labeled clk_in, at clock input 240 and clock detector enable signal, labeled clk_det_en. If the clock detector enable signal clk_det_en is low, the clock sample signal clk_smp and the clock synchronization signal clk_sync remain low. If the clock detector enable signal clk_det_en is high, each $2^N$ clock cycles, the clock sample signal clk_smp and the clock synchronization signal clk_sync are high during just one clock period and remain low during $2^N-1$ clock cycles. An inverted clock sample signal, labeled clk_smp_b, is an inverted version of the clock sample signal clk_smp. An inverted clock synchronization signal, labeled clk_sync_b, is an inverted version of the clock synchronization signal clk_sync. A delayed inverted clock synchronization signal, labeled clk_sync_b_d, is a delayed version of the inverted clock synchronization signal clk_sync_b. As an example, the propagation delay of two inverters in series may be used to obtain the delayed inverted clock synchronization signal clk_sync_b_d from the inverted clock synchronization signal clk_sync_b. An inverted clock detector enable signal, labeled clk_det_enb, is an inverted version of the clock detector enable signal clk_det_en.

Functionally, the operation of D flip-flops 660 and 661 can be understood as providing a low logic level output at the Q output 682 of D flip-flop 661 if there is a pulse at the output of comparator 659 (i.e., the clock frequency is below or equal to the high limit) when the clock detector is enabled and the clock sample signal clk_smp and the clock synchronization signal clk_sync are both at a high logic level. If there is not a pulse at the output of the comparator 659 under such conditions (i.e., the clock frequency is above the high limit), the circuit comprising D flip-flops 660 and 661 will drive high the Q output 682 of D flip-flop 661 to signal the event.

Clock detector 109 comprises a clock stop detector comprising p-channel MOSFETs 662, 665, and 667, n-channel MOSFETs 663, 664, 668, 669, and 670, and capacitor 666. When the clock detector is disabled and clk_det_en signal is low, p-channel MOSFET 665 pre-charges capacitor 666 to positive power supply 238. When the clock detector is enabled and clk_det_en signal is high, p-channel MOSFET 662 tries to charge capacitor 666 and n-channel MOSFET 663 tries to discharge it, wherein a current through n-channel MOSFET 663 is limited by the reference current source connected to the source terminal of n-channel MOSFET 664. Thus, while n-channel MOSFET 663 tends to discharge capacitor 666 with a current reference Iref while clock input signal clk_in at connection 136 of FIG. 1 is at a high logic level, p-channel MOSFET 662 tends to charge capacitor 666 somewhat more forcefully (e.g., with more available current) while clock input signal clk_in at connection 136 of FIG. 1 is at a low logic level. Thus, capacitor 666 tends to charge to a high logic level. P-channel MOSFET 667 and n-channel MOSFET 668 form an inverter, inverting the logic level of capacitor 666. The current consumed by inverter composed by p-channel MOSFET 667 and n-channel MOSFET 668 is limited by a current reference at the source of n-channel MOSFET 669. Thus, if capacitor 666 is charged to a high logic level, the clock stop high signal clk_stop_high at node 685 at the output of the inverter formed by p-channel MOSFET 667 and n-channel MOSFET 668 remains at a low logic level. However, if the clock stops at a high logic level (or has a duty cycle where it is at a high logic level substantially more than it is at a low logic level for a given long period of time), capacitor 666 spends more time being discharged by n-channel MOSFET 663 than the time, if any, it spends being charged by p-channel MOSFET 662. Thus, node 684 falls to a low logic level, and that low logic level is inverted by p-channel MOSFET 667 and n-channel MOSFET 668 to assert the clock stop high signal clk_stop_high at node 685 at a high logic level. Since a similar clock stop low detector uses an inverted version ck_inb of clock input signal clk_in, if the clock stops at a low logic level (or has a duty cycle where it is at a low logic level substantially more than it is at a high logic level for a given long period of time), a capacitor similar to capacitor 666 spends more time being discharged by a n-channel MOSFET similar to n-channel MOSFET 663 than the time, if any, it spends being charged by a p-channel MOSFET similar to p-channel MOSFET 662. Thus, a node similar to node 684 falls to a low logic level, and that low logic level is inverted by an inverter to assert the clock stop low signal clk_stop_low at a node similar to node 685 (or node 690 in FIG. 4) at a high logic level. Thus, both clock stop high and clock stop low indications can be provided. NOR gate 671 provides a single clock out of range signal clock_out_of_range at connection 124 of FIG. 1, which is responsive to any of the ck_low, ck_high, clk_stop_high, and clk_stop_low signals. If separate signals are desired, the ck_low, ck_high, clk_stop_high, and/or clk_stop_low signals may be used separately.

It should be noted that the low frequency clock detector 187 and the high frequency clock detector 186 are immune to duty cycle manipulation since they are enabled for one clock cycle (e.g., from one rising edge of the clock signal to the next rising edge of the clock signal or from one falling edge of the clock signal to the next falling edge of the clock signal). By being dependent only upon the occurrence of rising edges or only upon the occurrence of falling edges, they are not dependent upon a relationship between a rising edge and a falling edge, so they are immune to tampering with such relationship.

If it is desired to provide detection of duty cycle tampering, instances of the low frequency clock detector and the high frequency clock detector of FIG. 6 may be provided but with control signals (e.g., clk_smp_b, clk_sync, clk_sync_b, clk_sync_b_d, and clk_det_en_b) configured to enable such instances in a way proportional to the duty cycle of the clock signal (e.g., from a rising edge of the clock signal to a falling edge of the clock signal or from a falling edge of the clock signal to a rising edge of the clock signal). The values of the equivalents of capacitors 655 and 658 in such instances may be correspondingly reduced to accommodate the shorter times of the half clock periods as opposed to the full clock periods of the low frequency clock detector and the high frequency clock detector. For example, for a nominal 50% duty cycle, the values of the equivalents of capacitors 655 and 658 in such instances may be reduced to half of the values of capacitors 655 and 658 in the low frequency clock detector and the high frequency clock detector. Accordingly, detection of abnormally high duty cycles and abnormally low duty cycles of a clock signal may be provided.

It should be noted that the time response of the clock stopped at low and the clock stopped at high circuitry can be adjusted by design and will depend mainly on the size of p-channel MOSFET 662, the sink current reference Iref, the capacitor 666, and aspect ratio of p-channel MOSFET 667 to n-channel MOSFET 668 (where that aspect ratio defines the inverter threshold to switch its output node 685 from low to high). In accordance with at least one exemplary embodiment, the time response of the clock stopped at low and the clock stopped at high circuitry was set to be a few milliseconds (e.g., 2 ms).

Figure 7:
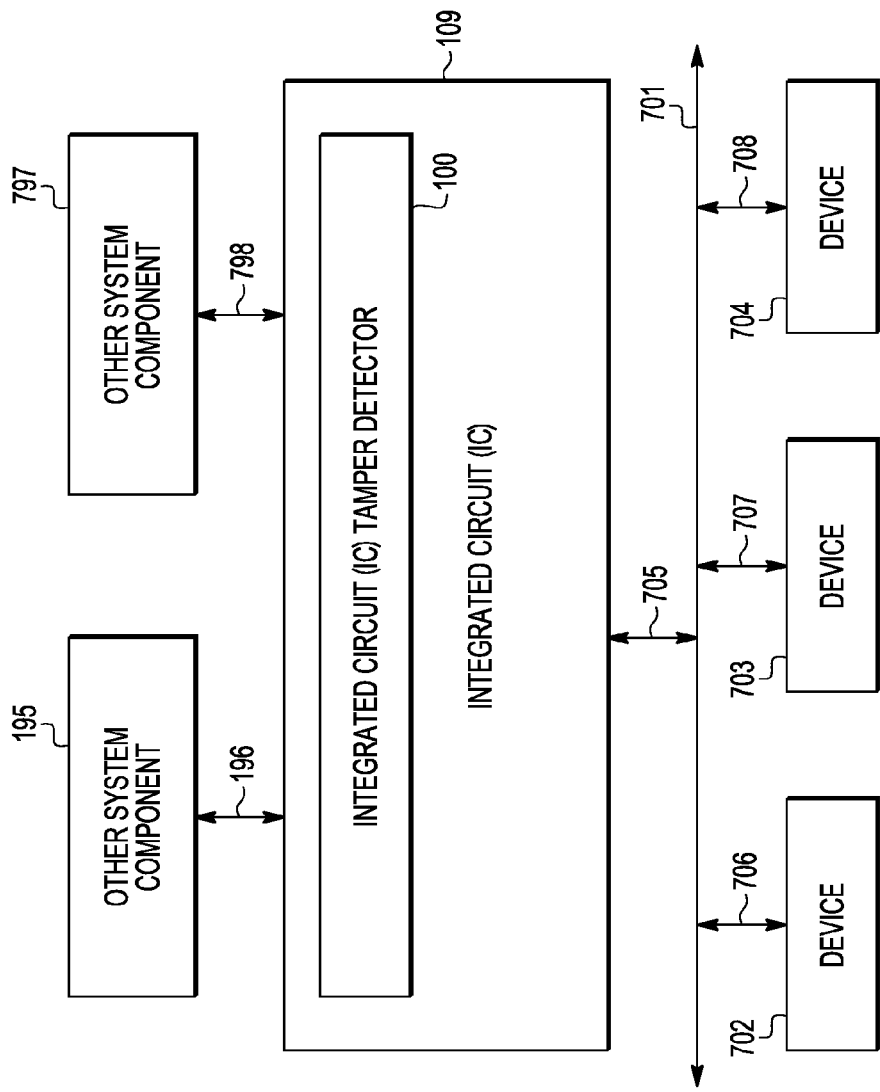
FIG. 7 is a block diagram illustrating a system comprising an integrated circuit (IC) comprising an IC tamper detector in accordance with at least one embodiment.

FIG. 7 is a block diagram illustrating a system comprising an integrated circuit (IC) comprising an IC tamper detector in accordance with at least one embodiment. The system comprises integrated circuit (IC) 109, other system component 195, other system component 797, bus 701, device 702, device 703, and device 704. IC 109 comprises IC tamper detector 100. IC 109 is connected to other system component 195 via connection 196. IC 109 is connected to other system component 797 via connection 798. IC 109 is connected to bus 701 via connection 705. Bus 701 is connected to device 702 via connection 706. Bus 701 is connected to device 703 via connection 707. Bus 701 is connected to device 704 via connection 708.

In accordance with at least one embodiment, IC tamper detector 100 operates on a supply voltage in a range of 1.5 to 3.7 volts. In accordance with at least one embodiment, IC tamper detector 100 draws less than one microampere of current. In accordance with at least one embodiment, IC tamper detector 100 consumes less than five microwatts of power. In accordance with at least one embodiment, IC tamper detector 100 operates over a temperature range from −50° C. to 150° C. In accordance with at least one embodiment, IC tamper detector 100 operates from a clock source of 32 KHz that can vary from 20 KHz to 40 KHz.

Figure 8:
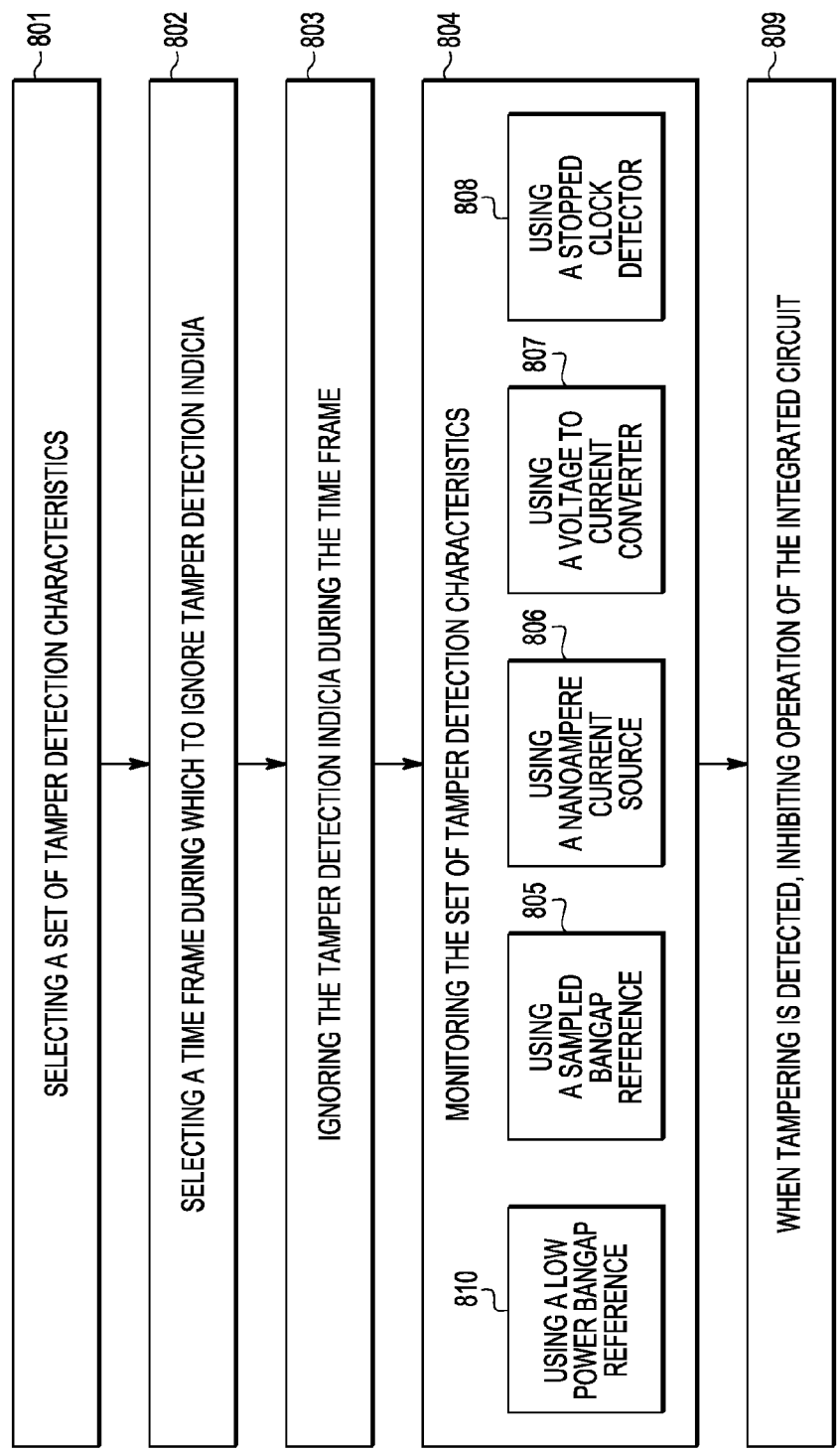
FIG. 8 is a flow diagram illustrating a method for tamper detection in accordance with at least one embodiment.

FIG. 8 is a flow diagram illustrating a method for tamper detection in accordance with at least one embodiment. The method comprises blocks 801, 802, 803, 804, and 809. In block 801, a set of tamper detection characteristics are selected. As an example, such tamper characteristics may comprise an abnormal voltage, such as an abnormal power supply voltage applied to an integrated circuit (IC). Such an abnormal voltage may comprise an abnormally low voltage. Such an abnormal voltage may comprise an abnormally high voltage. As another example, such tamper characteristics may comprise an abnormal temperature of the IC. Such an abnormal temperature may comprise an abnormally low temperature. Such an abnormal temperature may comprise an abnormally high temperature. As yet another example, such tamper characteristics may comprise an abnormal clock signal, such as an abnormal clock signal applied to the IC. Such an abnormal clock signal may comprise an abnormally low frequency clock signal. Such an abnormal clock signal may comprise an abnormally high frequency clock signal. Such an abnormal clock signal may comprise a stopped clock signal. Such a stopped clock signal may comprise a clock signal stopped at a low logic level. Such a stopped clock signal may comprise a clock signal stopped at a high logic level. Such an abnormal clock signal may comprise a clock signal having an abnormal duty cycle, wherein the duty cycle is the percentage of a clock cycle spent at a high logic level with regard to the total clock cycle (or clock period). Such a clock signal having an abnormal duty cycle may comprise a clock signal having an abnormally low duty cycle. Such a clock signal having an abnormal duty cycle may comprise a clock signal having an abnormally high duty cycle. The set of tamper detection characteristics may, for example, comprise the foregoing, the like, or any combination thereof. The selecting the set of tamper detection characteristics may occur, for example, in a tamper detector controller in the IC. The selecting may be performed, for example, based on values previously stored in protected registers in the IC accessible to the tamper detector controller. Such protected registers may be programmed, for example, during manufacture of the IC or, for example, during manufacture of a product comprising the IC. From block 801, the method continues to block 802. In block 802, a time frame during which to ignore tamper detection indicia is selected. As an example, the tamper detection indicia may comprise at least one indication of at least one abnormal condition pertaining to any element of the set of tamper detection characteristics. As an example, a time frame when spurious indications of the tamper detection indicia may occur may be selected, allowing such spurious indications to be ignored. The selecting of a time frame during which to ignore tamper detection indicia may be used, for example, to prevent false alarms based on the tamper detection indicia. As an example, the selecting a time frame during which to ignore tamper detection indicia may occur in a tamper detector controller in the IC. The selecting may be performed, for example, based on values previously stored in protected registers in the IC accessible to the tamper detector controller. Such protected registers may be programmed, for example, during manufacture of the IC or, for example, during manufacture of a product comprising the IC. From block 802, the method continues to block 803. In block 803, the tamper detection indicia are ignored during the time frame selected in block 802. The ignoring the tamper detection indicia during the time frame may be performed, for example, in the IC. As an example, the ignoring the tamper detection indicia during the time frame may be performed in a tamper detector controller in the IC. As another example, the ignoring the tamper detection indicia during the time frame may be performed by disabling enable signals for detectors, for example, at least one of a voltage detector, a temperature detector, and a clock detector during the time frame. From block 803, the method continues to block 804. In block 804, the set of tamper detection characteristics are monitored. As an example, the set of tamper detection characteristics may be monitored in the IC. Block 804 may comprise blocks 810, 805, 806, 807, and/or 808. In block 810, a low power bandgap reference is used to obtain a reference voltage source and/or a reference current source. In block 805, a sampled bandgap reference is used to obtain a reference voltage source and/or a reference current source. In block 806, a nanoampere current source is used. In block 807, a voltage to current converter is used to convert a reference voltage from a reference voltage source into a reference current, thereby providing a reference current source. In block 808, a stopped clock detector is used to provide a stopped clock indication. In block 809, when tampering is detected in block 804, operation of the integrated circuit (IC) is inhibited. As an example, the inhibiting operation of the IC may be performed in the IC. As an example of inhibiting operation of the IC, at least one input or output line of the IC may be disabled to prevent at least one signal from being provided to or obtained from the IC. As an example of inhibiting operation of the IC, a reset operation may be performed on the IC. As an example of inhibiting operation of the IC, the IC may be placed in a state disabling operation of the IC.

By selecting a time frame in block 802 during which to ignore tamper detection indicia and monitoring the set of tamper detection characteristics in block 804, the tamper detector can be tailored to one or more particular signatures indicative of tampering while avoiding false indications of tampering arising from normal IC operation. For example, if known transient abnormal conditions typically occur, for example, during a start-up process of an IC or a system comprising the IC, such transient abnormal conditions can be ignored, yet abnormal conditions indicative of tampering (e.g., matching a signature of characteristic values indicative of tampering) can be detected. Also, known transient phenomena, such as benign power glitches and/or microphonic (i.e., transducer-like) variations of clock oscillator operating resulting from shock or vibration, can be characterized and ignored, while events inconsistent with such characterizations can be regarded as suspected tampering, and tamper detection indications can be generated. Since the tamper detector components may operate intermittently (e.g., a clock detector 109 operating for one cycle each $2^N$ clock cycles), a tamper detector controller 102 can compare a given number of failing condition events (e.g., two or more in sequence) before signalizing the fail condition to the microcontroller unit (MCU) or to the system. As an example, a tamper detector controller 102 may wait until two consecutive abnormal voltage detections have occurred (e.g., on two consecutive operations of voltage detector 107) before signaling an abnormal voltage detection to the MCU or to the system. As another example, a tamper detector controller 102 may wait until two consecutive abnormal clock detections have occurred (e.g., on two consecutive operations of clock detector 109) before signaling an abnormal clock detection to the MCU or to the system. The number of detections required and their temporal proximity (e.g., whether they need to be consecutive or merely within a finite temporal window) may be varied in accordance with desired performance of the tamper detector.

Figure 9:
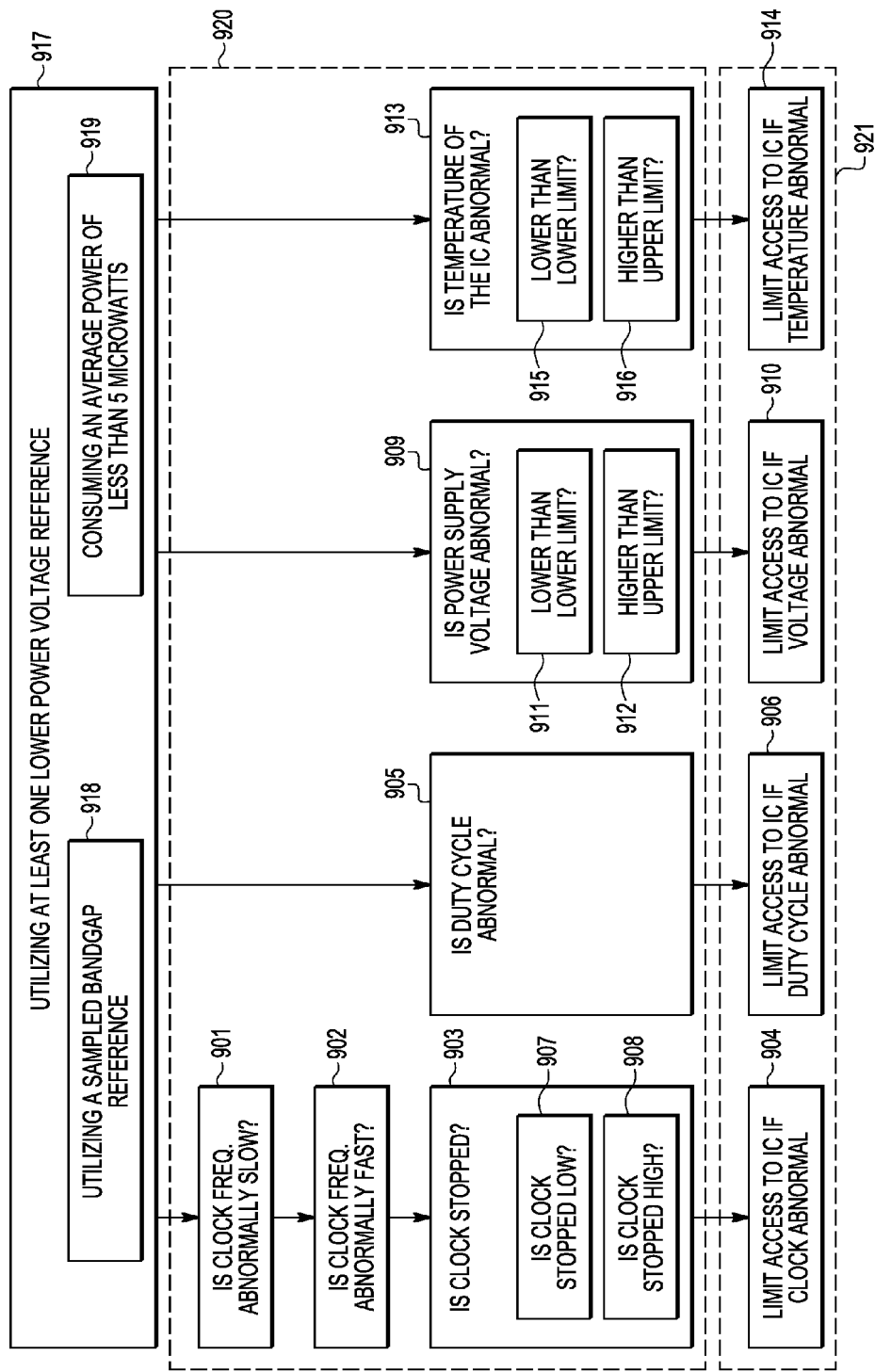
FIG. 9 is a flow diagram illustrating a method for limiting access to an integrated circuit (IC) in response to detection of an abnormal condition in accordance with at least one embodiment.

FIG. 9 is a flow diagram illustrating a method for limiting access to an integrated circuit (IC) in response to detection of an abnormal condition in accordance with at least one embodiment. The method comprises steps 901, 902, 903, and 904. In step 901, which is performed at the IC, a determination is made as to whether or not a clock frequency of a clock signal at the (IC) is abnormal by virtue of being slower than a specified lower clock frequency limit. In step 902, which is performed at the IC, a determination is made as to whether or not the clock frequency is abnormal by virtue of being faster than a specified upper clock frequency limit. In step 903, which is performed at the IC, a determination is made as to whether or not the clock frequency is abnormal by virtue of having stopped. In step 904, access to the IC is limited in response to determining the clock frequency is abnormal. In accordance with at least on embodiment, steps 901, 902, and 903 may be performed contemporaneously with each other, as shown by block 920. Step 903 further comprises steps 907 and 908. In step 907, a determination is made as to whether or not the clock signal has stopped at a low logic level. In step 908, a determination is made as to whether or not the clock signal has stopped at a high logic level.

The method further comprises step 917. In step 917, at least one low power voltage reference is utilized for the determining if the clock frequency is slower than the specified lower clock frequency limit and for determining if the clock frequency is faster than the specified upper clock frequency limit. Step 917 comprises step 918. In step 918, a sampled bandgap reference is utilized and is refreshed periodically to maintain accuracy of the low power voltage reference. Step 917 further comprises step 919. In step 919, the utilizing the low power voltage reference consumes an average power of less than five microwatts.

The method further comprises step 905. In step 905, which is performed at the IC, a determination is made as to whether or not a duty cycle of the clock signal is abnormal by virtue of the duty cycle being too large or too small. The method further comprises step 906. In step 906, access to the IC is limited in response to determining the duty cycle is abnormal. In accordance with at least one embodiment, steps 901, 902, 903, and 905 may be performed contemporaneously with each other, as shown by block 920. In accordance with at least one embodiment, steps 904 and 906 may be performed contemporaneously with each other, as shown by block 921.

The method further comprises steps 909 and 910. In step 909, which is performed at the IC, a determination is made as to whether or not a power supply voltage is abnormal by virtue of the power supply voltage being outside of a specified voltage range. In step 910, access to the IC is limited in response to determining the power supply voltage is abnormal. In accordance with at least one embodiment, the power supply voltage is an internally generated voltage provided within the IC. In accordance with at least one embodiment, the power supply voltage is an external voltage provided to the IC from an external source. In accordance with at least one embodiment, steps 901, 902, 903, and 909 may be performed contemporaneously with each other, as shown by block 920. In accordance with at least one embodiment, steps 904 and 910 may be performed contemporaneously with each other, as shown by block 921. Step 909 comprises steps 911 and 912. In step 911, a determination is made as to whether or not the power supply voltage of the IC is lower than a lower power supply voltage limit. In step 912, a determination is made as to whether or not the power supply voltage of the IC is higher than an upper power supply voltage limit.

The method further comprises steps 913 and 914. In step 913, which is performed at the IC, a determination is made as to whether or not a temperature of the IC is abnormal by virtue of the temperature of the IC being outside of a specified temperature range. In step 914, access to the IC is limited in response to determining the temperature of the IC is abnormal. In accordance with at least one embodiment, steps 901, 902, 903, and 913 may be performed contemporaneously with each other, as shown by block 920. In accordance with at least one embodiment, steps 904 and 914 may be performed contemporaneously with each other, as shown by block 921. Step 913 comprises steps 915 and 916. In step 915, a determination is made as to whether or not the temperature of the IC is lower than a lower temperature limit. In step 916, a determination is made as to whether or not the temperature of the IC is higher than an upper temperature limit.

As an example, a determination in accordance with at least one of steps 901, 902, 903, 905, 909, and 913 may be indicative of tampering with the IC, as some techniques for attempting to force an IC into a mode in which it was not designed to operate involve at least one of changing a clock frequency of a clock signal applied to the IC to a clock frequency outside of a specified clock frequency range of the IC, stopping a clock signal applied to the IC, changing a duty cycle of a signal applied to the IC to a duty cycle outside of a specified duty cycle range of the IC, changing a duty cycle of a signal applied to the IC to attempt to make a change to a clock frequency of a clock signal applied to the IC less detectable, changing, at least momentarily, a power supply voltage applied to the IC to a power supply voltage outside of a specified power supply voltage of the IC, and changing a temperature of the IC to be outside of a specified temperature range of the IC. Providing comprehensive detection of abnormal conditions of several parameters of the IC can help detect even complex tampering schemes and enable tampering countermeasures to be initiated. As an example, any or all of the steps in block 921 may comprise at least one of: inhibiting a external signal line of the IC, inhibiting execution of an instruction in the IC, resetting at least a portion of the IC, disabling reading of at least a portion of a memory array of the IC, and disabling execution of instructions stored in at least a portion of the memory array of the IC.

In accordance with at least one embodiment, a system is provided to effectively detect and prevent unauthorized use of a microcontroller unit (MCU) out of the specified voltage, temperature, and crystal oscillator frequency ranges. The tamper detection mechanism is capable of preventing an attempt by an attacker to perform an unauthorized use of the MCU, breaking its security to access critical customer data. The attacker may drive the MCU above and below the specified ranges of power supply, temperature, and crystal oscillator clock frequency. Once one of these variables is detected to be out of range, a correspondent flag is set to signalize to the MCU the potential attack. Then, the MCU may take an action to enhance the overall system security. As an example, the MCU may inhibit at least one input signal line. As an example, the MCU may inhibit at least one output signal line. As an example, the MCU may inhibit execution of at least one type of instruction. As an example, the MCU may perform a reset operation. As an example, the MCU may inhibit memory access to at least a portion of a memory array. As an example, the MCU may inhibit access to an IC by an application program. The circuit operates in a very low power mode (~1 µA) and operates in extended voltage and temperature ranges.

In accordance with at least one embodiment, the low and high voltage detector may be implemented to satisfy simultaneously low power consumption, temperature stability, small area, and high precision. Such an embodiment avoids the high power consumption of a continuously enabled bandgap reference or other continuously enabled voltage reference, thereby providing low power consumption. Such an embodiment can also provide high precision and good noise immunity. Such an embodiment can also avoid the complexity of a system requiring a low precision (coarse) voltage monitor and a high accuracy (fine) voltage monitor to work together. Such an embodiment can also avoid the process and temperature dependencies and consequent inaccuracies of a detector where the trip-point is related to the addition of PMOS and NMOS transistor threshold voltages.

In accordance with at least one embodiment, a sampled bandgap strategy saves power but maintains reliable reference voltages for all the system, including three low power detectors. Since the bandgap is refreshed from time to time, the system utilizes a clock source. The ladder resistor in the voltage tamper detector is built with high resistivity P+ polycrystalline silicon resistors to reduce area and power consumption.

In accordance with at least one embodiment, the temperature detector uses self cascode MOSFET (SCM) structures to create two proportional-to-absolute-temperature (PTAT) voltages for the low and high trip-points. Bias currents (in the range of nanoamperes) are integrated over two timing caps in the clock tamper during one clock period. If the clock is slow, a pulse is generated. If clock is fast, a pulse absence is detected. If no clock is detected, a fail condition is signalized.

In accordance with at least one embodiment, a counter is used to control bandgap refreshment and clock detector sampling synchronization. In accordance with at least one embodiment, a sampled bandgap with voltage divider and sampling caps is used to generate/store reference voltages. In accordance with at least one embodiment, a ~nA current reference circuit and a voltage-to-current (V2I) converter are used to provide reference current sources. In accordance with at least one embodiment, a voltage divider plus two low power comparators are used in the voltage tamper detector. In accordance with at least one embodiment, two SCMs plus two low power comparators are used in the temperature detector. In accordance with at least one embodiment, a two current mirrors charging two timing caps plus two low power comparators and some logic are used in the clock tamper detector.

In accordance with at least one embodiment, a tamper detection for up to three different variables is provided, namely voltage, temperature, and clock frequency. In accordance with at least one embodiment, an IC tamper detector distinctively employs a sampled bandgap refreshed periodically to maintain the voltage and current reference in the system with a given accuracy. The sampled bandgap scheme allows the IC tamper detector to minimize power consumption.

In accordance with at least one embodiment, high and low trip-points are provided for each variable, allowing sensing of the variable having a value that is too low as well as sensing of the variable having a value that is too high. In accordance with at least one embodiment, in the voltage detector, a highly resistive polycrystalline silicon resistor is used to minimize power consumption and reduce area. In accordance with at least one embodiment, a temperature sensor uses a sampled bandgap and sub-one-volt (sub-1V) voltage reference to reduce power consumption. In accordance with at least one embodiment, the fast clock tamper detects a pulse absence. In accordance with at least one embodiment, the clock detector also includes a clock stop feature able to detect if the clock remains at high state or a low state instead of periodically transitioning between high and low states. In accordance with at least one embodiment, a voltage tamper detector provides a power supply monitor, utilizes low power comparators, provides a low and high power supply supervisor, provides a low and high voltage detector, a low and high voltage inhibit, and/or a low and high voltage indicator.

In accordance with at least one embodiment, a temperature detector employs a sampled bandgap and sub-1V references to minimize power consumption. In accordance with at least one embodiment, a temperature detector uses self cascode MOSFETs (SCMs) to generate a proportional-to-absolute-voltage (PTAT) voltage to compare against a given reference. In accordance with at least one embodiment, a temperature detector uses a V2I converter to generate a temperature compensated bias current and to minimize the current source variation over process variables. In accordance with at least one embodiment, a low power temperature sensor and/or a low power temperature detector is provided.

In accordance with at least one embodiment, a clock detector provides low power consumption and provides lower and higher frequency trip-points. In accordance with at least one embodiment, a clock detector detects slow clocks and/or fast clocks. In accordance with at least one embodiment, a clock detector is immune to duty cycle manipulation. In accordance with at least one embodiment, a clock detector uses current starved inverters and thus minimizes power consumption. In accordance with at least one embodiment, a clock detector simultaneously provides slow/fast clock detection and clock stop detection (at high/low levels). In accordance with at least one embodiment, a low power clock detector, a frequency to voltage converter, a time to voltage converter, and/or clock detection is provided. In accordance with at least one embodiment, a clock detector is capable of monitoring a low frequency (e.g., 32 KHz) clock typically used with low power microcontrollers.

In accordance with at least one embodiment, a tamper detector may be implemented in a microcontroller unit (MCU) to provide low power tamper detection against adversaries attempting to alter operational parameters of the MCU. In accordance with at least one embodiment, a tamper detector may be implemented in system-on-a-chip (SoC) devices to provide low power tamper detection against adversaries attempting to alter operational parameters of the SoC. In accordance with at least one embodiment, a tamper detector is fully compatible with standard CMOS technologies, able to operate at low voltage, simple to implement, following a low risk design approach, occupying reduced area, and/or providing very low power consumption. In accordance with at least one embodiment, a tamper detector may be efficiently implemented in low-cost, low-power semiconductor products. In accordance with at least one embodiment, a tamper detector may be implemented near a crystal oscillator within an integrated circuit (IC), for example, within low power MCUs. In accordance with at least one embodiment, a sampled bandgap voltage reference may be implemented using a storage capacitor of a few picofarads (pF) connected by a switch to a bandgap voltage reference. The bandgap voltage reference may be enabled intermittently to obtain a reference voltage. The switch may be closed to charge the storage capacitor to the reference voltage. The switch may be opened to isolate the storage capacitor from the bandgap voltage reference. Then, the bandgap voltage reference may be disabled to save power while the storage capacitor holds the reference voltage. By supplying the reference voltage to high impedance inputs, for example, a high input impedance comparator, the leakage current from the storage capacitor may be minimized, allowing the duration between instances of enablement of the bandgap voltage reference to be maximized.

In accordance with at least one embodiment, a method comprises determining at an integrated circuit (IC) if a clock frequency of a clock signal at the (IC) is abnormal by virtue of being slower than a specified lower clock frequency limit, determining at the IC if the clock frequency is abnormal by virtue of being faster than a specified upper clock frequency limit, determining at the IC if the clock frequency is abnormal by virtue of having stopped, and limiting access to the IC in response to determining the clock frequency is abnormal. In accordance with at least one embodiment, the determining steps may be performed contemporaneously with each other. In accordance with at least one embodiment, the determining at the IC if the clock frequency of the clock signal at the IC is abnormal by virtue of being slower than a specified lower clock frequency limit is independent of a duty cycle of the clock signal. In accordance with at least one embodiment, the determining at the IC if the clock frequency is abnormal by virtue of being faster than a specified upper clock frequency limit is independent of the duty cycle. In accordance with at least one embodiment, the method further comprises determining at the IC if a duty cycle of the clock signal is abnormal by virtue of the duty cycle being outside of a specified duty cycle range and limiting access to the IC in response to determining the duty cycle is abnormal. In accordance with at least one embodiment, the determining if the clock signal has stopped further comprises determining if the clock signal has stopped at a low logic level and determining if the clock signal has stopped at a high logic level. In accordance with at least one embodiment, the method further comprises determining at the IC if a power supply voltage is abnormal by virtue of the power supply voltage being outside of a specified voltage range. In accordance with at least one embodiment, the method further comprises limiting access to the IC in response to determining the power supply voltage is abnormal. In accordance with at least one embodiment, the power supply voltage is an internally generated voltage generated within the IC. In accordance with at least one embodiment, the power supply voltage is an external voltage provided to the IC. In accordance with at least one embodiment, the determining at the IC if the power supply voltage is abnormal by virtue of the power supply voltage being outside of the specified voltage range comprises determining if the power supply voltage of the IC is lower than a lower power supply voltage limit and determining if the power supply voltage of the IC is higher than an upper power supply voltage limit. In accordance with at least one embodiment, the method further comprises determining at the IC if a temperature of the IC is outside a specified temperature range. In accordance with at least one embodiment, the method further comprises limiting access to the IC in response to determining the temperature of the IC is abnormal. In accordance with at least one embodiment, the determining at the IC if the temperature of the IC is outside the specified temperature range comprises determining if the temperature of the IC is lower than a lower temperature limit and determining if the temperature of the IC is higher than an upper temperature limit. In accordance with at least one embodiment, the method further comprises utilizing at least one low power voltage reference for the determining if the clock frequency is slower than the specified lower clock frequency limit and for determining if the clock frequency is faster than the specified upper clock frequency limit. In accordance with at least one embodiment, the utilizing the low power voltage reference comprises utilizing a sampled bandgap reference, wherein the sampled bandgap reference is refreshed periodically to maintain accuracy of the low power voltage reference. In accordance with at least one embodiment, the utilizing the low power voltage reference consumes an average power of less than five microwatts.

In accordance with at least one embodiment, an integrated circuit (IC) comprises a clock detector, the clock detector comprising a low clock frequency detector to detect if a clock signal at a node of the IC is abnormal by virtue of a frequency of the clock signal being below a specified lower limit, a high clock frequency detector to detect if the clock signal at the node is abnormal by virtue of the frequency of the clock signal being above a specified upper limit, and a stopped clock detector to detect if the clock signal at the node is abnormal by virtue of the clock signal being stopped. In accordance with at least one embodiment, the IC comprises a tamper controller to limit access to the IC in response to determining the clock signal is abnormal. In accordance with at least one embodiment, the clock detector further comprises an abnormal duty cycle detector to detect if the clock signal at the node is abnormal by virtue of the clock signal having a duty cycle that is outside of a specified duty cycle range. In accordance with at least one embodiment, the stopped clock detector further comprises a clock stopped low detector to detect if the clock signal at the node is abnormal by virtue of the clock signal being stopped at a low logic level and a clock stopped high detector to detect if the clock signal at the node is abnormal by virtue of the clock signal being stopped at a high logic level. In accordance with at least one embodiment, the IC further comprises a voltage detector to detect if a power supply voltage is abnormal by virtue of the power supply voltage being outside of a specified power supply voltage range. In accordance with at least one embodiment, the voltage detector comprises a low voltage detector to detect if a power supply voltage is abnormal by virtue of the power supply voltage being below the specified power supply voltage range and a high voltage detector to detect if a power supply voltage is abnormal by virtue of the power supply voltage being above the specified power supply voltage range. In accordance with at least one embodiment, the IC further comprises a temperature detector to detect if a temperature is abnormal by virtue of the temperature being outside of a specified temperature range. In accordance with at least one embodiment, the temperature detector comprises a low temperature detector to detect if a temperature is abnormal by virtue of the temperature being below the specified temperature range and a high temperature detector to detect if a temperature is abnormal by virtue of the temperature being above the specified temperature range. In accordance with at least one embodiment, the IC further comprises a low power voltage reference coupled to the voltage detector and to the clock detector and to the temperature detector. In accordance with at least one embodiment, the low power voltage reference comprises a sampled bandgap reference, wherein the sampled bandgap reference is refreshed periodically to maintain accuracy of the low power voltage reference. In accordance with at least one embodiment, the low power voltage reference consumes an average power of less than five microwatts during operation of the IC tamper detector.

In accordance with at least one embodiment, an integrated circuit (IC) comprises a voltage detector for detecting tampering with a power supply voltage of the IC and a temperature detector for detecting tampering with a temperature of the IC, wherein a combined average power consumption of the voltage detector and the temperature detector is less than five microwatts. In accordance with at least one embodiment, the IC further comprises a clock detector for detecting an abnormal clock signal, wherein the abnormal clock signal is, at times, a slow clock signal, a fast clock signal, and a stopped clock signal, wherein a total combined average power consumption of the voltage detector, the temperature detector, and the clock detector is less than five microwatts.

In accordance with at least one embodiment, a method for tamper detection in an integrated circuit (IC) is provided. The method comprises determining if a clock frequency is slower than a specified lower clock frequency limit, determining if a clock frequency is faster than a specified upper clock frequency limit, and determining if a clock signal has stopped. In accordance with at least one embodiment, the method further comprises determining if the clock signal has as abnormal duty cycle. In accordance with at least one embodiment, the determining if the clock signal has stopped further comprises determining if the clock signal has stopped at a low logic level, and determining if the clock signal has stopped at a high logic level. In accordance with at least one embodiment, the method further comprises monitoring a power supply voltage of the IC. In accordance with at least one embodiment, the monitoring the power supply voltage of the IC comprises determining if the power supply voltage of the IC is lower than a lower power supply voltage limit, and determining if the power supply voltage of the IC is higher than an upper power supply voltage limit. In accordance with at least one embodiment, the method further comprises monitoring a temperature of the IC. In accordance with at least one embodiment, the monitoring the temperature of the IC comprises determining if the temperature of the IC is lower than a lower temperature limit, and determining if the temperature of the IC is higher than an upper temperature limit. In accordance with at least one embodiment, the method further comprises utilizing a low power voltage reference for the determining if the clock frequency is slower than the specified lower clock frequency limit and for determining if the clock frequency is faster than the specified upper clock frequency limit. In accordance with at least one embodiment, the utilizing the low power voltage reference comprises utilizing a sampled bandgap reference, wherein the sampled bandgap reference is refreshed periodically to maintain accuracy of the low power voltage reference. In accordance with at least one embodiment, the utilizing the low power voltage reference comprises consuming an average power of less than five microwatts.

In accordance with at least one embodiment, an integrated circuit (IC) tamper detector is provided. The IC tamper detector comprises a clock detector. The clock detector comprises a low clock frequency detector, a high clock frequency detector, and a stopped clock detector. In accordance with at least one embodiment, the clock detector further comprises an abnormal duty cycle detector. In accordance with at least one embodiment, the stopped clock detector further comprises a clock stopped low detector, and a clock stopped high detector. In accordance with at least one embodiment, the IC tamper detector further comprises a voltage detector. In accordance with at least one embodiment, the voltage detector comprises a low voltage detector, and a high voltage detector. In accordance with at least one embodiment, the IC tamper detector further comprises a temperature detector. In accordance with at least one embodiment, the temperature detector comprises a low temperature detector, and a high temperature detector. In accordance with at least one embodiment, the IC tamper detector further comprises a low power voltage reference coupled to the voltage detector and to the clock detector and to the temperature detector. In accordance with at least one embodiment, the low power voltage reference comprises a sampled bandgap reference, wherein the sampled bandgap reference is refreshed periodically to maintain accuracy of the low power voltage reference. In accordance with at least one embodiment, the low power voltage reference consumes an average power of less than five microwatts during operation of the IC tamper detector.

In accordance with at least one embodiment, an integrated circuit (IC) tamper detector is provided. The IC tamper detector comprises a voltage detector for detecting tampering with a power supply voltage of the IC, and a temperature detector for detecting tampering with a temperature of the IC, the IC tamper detector consuming less than five microwatts of power. In accordance with at least one embodiment, the IC tamper detector further comprises a clock detector for detecting an abnormal clock signal, wherein the abnormal clock signal is, at times, a slow clock signal, a fast clock signal, and a stopped clock signal.

In accordance with at least one embodiment, an integrated circuit (IC) tamper detector is provided. The IC tamper detector comprises a voltage abnormality tamper detector, a temperature abnormality tamper detector, and a clock abnormality tamper detector. In accordance with at least one embodiment, the IC tamper detector comprises a sampled bandgap reference. In accordance with at least one embodiment, the voltage abnormality tamper detector comprises a polycrystalline silicon resistor. In accordance with at least one embodiment, the polycrystalline silicon resistor comprises a multi-megohm polycrystalline silicon resistor. In accordance with at least one embodiment, the temperature abnormality tamper detector comprises a self cascode MOSFET circuit. In accordance with at least one embodiment, the voltage abnormality tamper detector comprises a low voltage abnormality tamper detector and a high voltage abnormality tamper detector. In accordance with at least one embodiment, the temperature abnormality tamper detector comprises a low temperature abnormality tamper detector and a high temperature abnormality tamper detector. In accordance with at least one embodiment, the clock abnormality tamper detector comprises a low frequency clock abnormality tamper detector and a high frequency clock abnormality tamper detector. In accordance with at least one embodiment, the low frequency clock abnormality tamper detector is responsive to a slow clock signal including a stopped clock signal.

In accordance with at least one embodiment, an integrated circuit (IC) tamper detector is provided. The IC tamper detector comprises a sampled bandgap reference, wherein the sampled bandgap reference is refreshed periodically to maintain accuracy of a reference selected from a group consisting of a voltage reference and a current reference. In accordance with at least one embodiment, the reference is compared to supply voltage scaled down using a multi-megohm polycrystalline silicon resistor divider. In accordance with at least one embodiment, a voltage detector comprises the multi-megohm polycrystalline silicon resistor divider, and two comparators, a first of the two comparators to provide comparison to a low voltage threshold and a second of the two comparators to provide comparison to a high voltage threshold. In accordance with at least one embodiment, the IC tamper detector further comprises a temperature abnormality tamper detector. In accordance with at least one embodiment, the temperature abnormality tamper detector comprises a low temperature abnormality tamper detector. In accordance with at least one embodiment, the low temperature abnormality tamper detector comprises a low temperature self cascode MOSFET circuit, and a low temperature comparator coupled to the self cascode MOSFET circuit. In accordance with at least one embodiment, the temperature abnormality tamper detector comprises a high temperature abnormality tamper detector. In accordance with at least one embodiment, the high temperature abnormality tamper detector comprises a high temperature self cascode MOSFET circuit, and a high temperature comparator coupled to the self cascode MOSFET circuit. In accordance with at least one embodiment, the IC tamper detector further comprises a clock abnormality tamper detector. In accordance with at least one embodiment, the clock abnormality tamper detector comprises a slow clock abnormality tamper detector. In accordance with at least one embodiment, the slow clock abnormality tamper detector comprises a slow clock current mirror coupled to a clock signal, a slow clock capacitor coupled to the slow clock current mirror, and a slow clock comparator coupled to the slow clock capacitor. In accordance with at least one embodiment, the clock abnormality tamper detector comprises a fast clock abnormality tamper detector. In accordance with at least one embodiment, the fast clock abnormality tamper detector comprises a fast clock current mirror coupled to a clock signal, a fast clock capacitor coupled to the fast clock current mirror, and a fast clock comparator coupled to the fast clock capacitor. In accordance with at least one embodiment, the clock abnormality tamper detector further comprises a stopped clock detector.

In accordance with at least one embodiment, a method performed by a tamper detector within an integrated circuit is provided. In accordance with at least one embodiment, the method comprises monitoring for a possible presence of an abnormal supply voltage being supplied to the integrated circuit, monitoring for the possible presence of an abnormal temperature of the integrated circuit, and monitoring for the possible presence of an abnormal clock signal supplied to the integrated circuit. In accordance with at least one embodiment, the monitoring for the possible presence of an abnormal supply voltage being supplied to the integrated circuit comprises monitoring for the possible presence of an abnormally low supply voltage and monitoring for the possible presence of an abnormally high supply voltage. In accordance with at least one embodiment, the monitoring for the possible presence of an abnormal temperature of the integrated circuit comprises monitoring for an abnormally low temperature and monitoring for an abnormally high temperature. In accordance with at least one embodiment, the monitoring for the possible presence of an abnormal clock signal supplied to the integrated circuit further comprises monitoring for an abnormally slow clock signal and monitoring for an abnormally fast clock signal. In accordance with at least one embodiment, the monitoring for the possible presence of an abnormal clock signal supplied to the integrated circuit further comprises monitoring for the possible presence of a stopped clock signal. In accordance with at least one embodiment, the method further comprises intermittently sampling a bandgap reference to maintain accuracy of the tamper detector. In accordance with at least one embodiment, the monitoring for the possible presence of the abnormal supply voltage being supplied to the integrated circuit comprises using a multi-megohm polycrystalline silicon resistor divider to monitor for the possible presence of the abnormal supply voltage being supplied to the integrated circuit. In accordance with at least one embodiment, the monitoring for the possible presence of the abnormal temperature of the integrated circuit comprises using a self cascode MOSFET circuit to monitor for the possible presence of the abnormal temperature of the integrated circuit. In accordance with at least one embodiment, the monitoring for the possible presence of the abnormal temperature of the integrated circuit comprises using a sub-1volt voltage reference to monitor for the possible presence of the abnormal temperature of the integrated circuit.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. An integrated circuit (IC) comprising:
a voltage detector for detecting tampering with a power supply voltage of the IC; and
a temperature detector for detecting tampering with a temperature of the IC, wherein a combined average power consumption of the voltage detector and the temperature detector is less than five microwatts.

2. The IC of claim 1 further comprising:
a clock detector for detecting an abnormal clock signal, wherein a total combined average power consumption of the voltage detector, the temperature detector, and the clock detector is less than five microwatts.

3. The IC of claim 2 wherein the clock detector comprises:
a stopped clock detector for detecting a clock signal being stopped.

4. The IC of claim 3 wherein the stopped clock detector further comprises:
a clock stopped low detector to detect if the clock signal at a node of the IC is abnormal by virtue of the clock signal being stopped at a low logic level; and
a clock stopped high detector to detect if the clock signal at the node is abnormal by virtue of the clock signal being stopped at a high logic level.

5. The IC of claim 2 wherein the clock detector comprises:
a slow clock detector for detecting when a clock frequency of a clock signal at the IC is abnormal by virtue of being slower than a specified lower clock frequency limit independent of a duty cycle of the clock signal.

6. The IC of claim 2 wherein the clock detector comprises:
a fast clock detector for detecting when a clock frequency of a clock signal at the IC is abnormal by virtue of being faster than a specified upper clock frequency limit independent of a duty cycle of the clock signal.

7. The IC of claim 2 wherein the clock detector further comprises:
an abnormal duty cycle detector to detect if the clock signal at a node of the IC is abnormal by virtue of the clock signal having a duty cycle that is outside of a specified duty cycle range.

8. The IC of claim 1 wherein the IC limits access to the IC in response to detection of tampering, wherein limiting the access comprises at least one of: inhibiting an external signal line of the IC, inhibiting execution of an instruction in the IC, resetting at least a portion of the IC, disabling reading of at least a portion of a memory array of the IC, and disabling execution of instructions stored in at least a portion of the memory array of the IC.

9. A method, at an integrated circuit (IC), comprising:
detecting, using a voltage detector of the IC, tampering with a power supply voltage of the IC; and
detecting, using a temperature detector of the IC, tampering with a temperature of the IC, wherein a combined average power consumption of the voltage detector and the temperature detector is less than five microwatts.

10. The method of claim 9 further comprising:
detecting, using a clock detector of the IC, an abnormal clock signal, wherein a total combined average power consumption of the voltage detector, the temperature detector, and the clock detector is less than five microwatts.

11. The method of claim 10 wherein the detecting, using the clock detector of the IC, the abnormal clock signal comprises:
detecting, using a stopped clock detector of the IC, a clock signal being stopped.

12. The method of claim 11 wherein detecting, using the stopped clock detector of the IC, the clock signal being stopped comprises:
detecting, using a clock stopped low detector of the IC, when the clock signal at a node of the IC is abnormal by virtue of the clock signal being stopped at a low logic level; and
detecting, using a clock stopped high detector of the IC, when the clock signal at the node is abnormal by virtue of the clock signal being stopped at a high logic level.

13. The method of claim 10 wherein the detecting, using the clock detector of the IC, the abnormal clock signal comprises:
detecting, using a slow clock detector of the IC, when a clock frequency of a clock signal at the IC is abnormal by virtue of being slower than a specified lower clock frequency limit independent of a duty cycle of the clock signal.

14. The method of claim 10 wherein the detecting, using the clock detector of the IC, the abnormal clock signal comprises:
detecting, using a fast clock detector of the IC, when a clock frequency of a clock signal at the IC is abnormal by virtue of being faster than a specified upper clock frequency limit independent of a duty cycle of the clock signal.

15. The method of claim 10 wherein the detecting, using the clock detector of the IC, the abnormal clock signal comprises:
detecting, using an abnormal duty cycle detector of the IC, when the clock signal at a node of the IC is abnormal by virtue of the clock signal having a duty cycle that is outside of a specified duty cycle range.

16. The method of claim 9 further comprising:
limiting, by the IC, access to the IC in response to detection of tampering, wherein the limiting the access comprises at least one of: inhibiting an external signal line of the IC, inhibiting execution of an instruction in the IC, resetting at least a portion of the IC, disabling reading of at least a portion of a memory array of the IC, and disabling execution of instructions stored in at least a portion of the memory array of the IC.

17. An integrated circuit (IC) comprising:
a voltage detector for detecting tampering with a power supply voltage of the IC;
a temperature detector for detecting tampering with a temperature of the IC, wherein a combined average power consumption of the voltage detector and the temperature detector is less than five microwatts; and
a tamper detector controller, the tamper detector controller coupled to the voltage detector and to the temperature detector, the tamper detector controller for limiting access to the IC in response to detection of tampering, wherein limiting the access comprises at least one of: inhibiting an external signal line of the IC, inhibiting execution of an instruction in the IC, resetting at least a portion of the IC, disabling reading of at least a portion of a memory array of the IC, and disabling execution of instructions stored in at least a portion of the memory array of the IC.

18. The IC of claim 17 further comprising:
a clock detector for detecting an abnormal clock signal, the clock detector coupled to the tamper detector controller, wherein a total combined average power consumption of the voltage detector, the temperature detector, and the clock detector is less than five microwatts.

19. The IC of claim 17 wherein the clock detector comprises:
a stopped clock detector for detecting a clock signal being stopped.

20. The IC of claim 17 further comprising:
a sampled bandgap reference coupled to the temperature detector, the temperature detector referring to an output of the sampled bandgap reference to determine the temperature of the IC.

* * * * *